(12) United States Patent
Yamato et al.

(10) Patent No.: US 10,203,879 B2
(45) Date of Patent: Feb. 12, 2019

(54) CONTROL DEVICE AND CONTROL METHOD

(71) Applicant: FUJITSU LIMITED, Kawasaki-shi, Kanagawa (JP)

(72) Inventors: Takaaki Yamato, Nagano (JP); Fumio Matsuo, Nagano (JP); Nobuyuki Hirashima, Nagano (JP); Katsuo Enohara, Kawaguchi (JP); Takashi Murayama, Nagano (JP); Takuya Kurihara, Nagano (JP); Ryota Tsukahara, Kawasaki (JP); Toshiaki Takeuchi, Nagano (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 124 days.

(21) Appl. No.: 15/216,994

(22) Filed: Jul. 22, 2016

(65) Prior Publication Data
US 2017/0031605 A1  Feb. 2, 2017

(30) Foreign Application Priority Data
Jul. 30, 2015 (JP) .................................. 2015-150204

(51) Int. Cl.
G06F 3/06 (2006.01)

(52) U.S. Cl.
CPC .......... *G06F 3/0608* (2013.01); *G06F 3/0631* (2013.01); *G06F 3/0644* (2013.01); *G06F 3/0659* (2013.01); *G06F 3/0686* (2013.01)

(58) Field of Classification Search
CPC .... G06F 3/0686; G06F 3/0659; G06F 3/0631; G06F 3/0608; G06F 3/0644

USPC ........................................................... 711/10
See application file for complete search history.

(56) References Cited

U.S. PATENT DOCUMENTS

| 5,546,557 A * | 8/1996 | Allen ..................... G06F 3/0601 360/49 |
| 5,940,849 A | 8/1999 | Koyama |
| 8,862,850 B2 * | 10/2014 | Inai ........................ G06F 3/0617 711/103 |
| 2008/0162813 A1 * | 7/2008 | Haustein ............... G06F 3/0613 711/115 |

(Continued)

FOREIGN PATENT DOCUMENTS

| JP | 9-160727 | 6/1997 |
| JP | 2013-161234 | 8/2013 |

*Primary Examiner* — Hashem Farrokh
(74) *Attorney, Agent, or Firm* — Staas & Halsey LLP

(57) ABSTRACT

A control device includes a processor. The processor is configured to receive an execution request for write processing of writing data of logical volumes to second physical volumes. The data of the logical volumes is stored in first physical volumes. The processor is configured to generate write information on basis of data sizes of the respective logical volumes and free spaces of storage areas of the respective second physical volumes. The processor is configured to perform, on basis of the write information, control of writing first data of the logical volumes from a cache unit to the second physical volumes. The processor is configured to perform control of reading second data of the logical volumes from the first physical volumes to the cache unit. The processor is configured to optimize the write information in response to completion of the control of reading.

15 Claims, 24 Drawing Sheets

(56) References Cited

U.S. PATENT DOCUMENTS

| | | | |
|---|---|---|---|
| 2008/0250197 A1* | 10/2008 | Daily | G11B 20/1201 |
| | | | 711/111 |
| 2011/0145528 A1* | 6/2011 | Watanabe | G06F 3/0605 |
| | | | 711/162 |
| 2012/0110257 A1* | 5/2012 | Enohara | G06F 3/0611 |
| | | | 711/111 |
| 2013/0205083 A1* | 8/2013 | Yamato | G06F 12/0866 |
| | | | 711/111 |

* cited by examiner

FIG. 4

| LV NAME | PV NAME | TVC | DATA SIZE | FINAL UPDATE TIME |
|---|---|---|---|---|
| LV0001 | PV0001 | OFF-CACHE | 64 GB | JULY 1, 2015 18:38:19 |
| LV0002 | PV0002 | OFF-CACHE | 128 GB | JULY 1, 2015 20:42:54 |
| LV0003 | PV0003 | OFF-CACHE | 64 GB | JULY 1, 2015 23:11:40 |
| .. | .. | .. | .. | .. |

| LV NAME | DATA SIZE |
|---|---|
| LV1 | 10 GB |
| LV2 | 10 GB |
| LV3 | 90 GB |
| LV4 | 70 GB |
| LV5 | 20 GB |

TOTAL DATA SIZE: 200 GB

| GROUP | PV NAME | DATA STORAGE SIZE |
|---|---|---|
| GR001 | PV1 | 100 GB |
| GR001 | PV2 | 100 GB |
| ⋮ | ⋮ | ⋮ |

| LV NAME | DATA SIZE |
|---------|-----------|
| LV3 | 90 GB |
| LV4 | 70 GB |
| LV5 | 20 GB |
| LV1 | 10 GB |
| LV2 | 10 GB |

| LV NAME | DATA SIZE | TVC |
|---------|-----------|-----|
| LV3 | 90 GB | ON-CACHE |
| LV4 | 70 GB | ON-CACHE |
| LV5 | 20 GB | OFF-CACHE |
| LV1 | 10 GB | OFF-CACHE |
| LV2 | 10 GB | ON-CACHE |

LV LIST FOR PV1

| LV NAME | DATA SIZE | PV REMAINING CAPACITY | EXPORT IMPLEMENTATION FLAG |
|---|---|---|---|
| LV3 | 90 GB | 100 GB (INITIAL VALUE) | 2 |
| LV1 | 10 GB | 10 GB | |
| | | 0 GB | |
| | | | |

LV LIST FOR PV2

| LV NAME | DATA SIZE | PV REMAINING CAPACITY | EXPORT IMPLEMENTATION FLAG |
|---|---|---|---|
| LV4 | 70 GB | 100 GB (INITIAL VALUE) | 1 |
| LV5 | 20 GB | 30 GB | |
| LV2 | 10 GB | 10 GB | |
| | | 0 GB | |

EXPORT IMPLEMENTATION FLAG
1: NOT YET IMPLEMENTED
2: CURRENTLY IMPLEMENTED
0 OR NULL: ALREADY IMPLEMENTED

FIG. 10

LV LIST FOR PV1

| LV NAME | DATA SIZE | PV REMAINING CAPACITY | EXPORT IMPLEMENTATION FLAG |
|---|---|---|---|
| LV3 | 90 GB | 100 GB (INITIAL VALUE) | 2 |
| | | 10 GB | |
| | | | |
| | | | |

LV LIST FOR PV2

| LV NAME | DATA SIZE | PV REMAINING CAPACITY | EXPORT IMPLEMENTATION FLAG |
|---|---|---|---|
| LV4 | 70 GB | 100 GB (INITIAL VALUE) | 1 |
| LV2 | 10 GB | 30 GB | |
| | | 20 GB | |
| | | | |

EXPORT IMPLEMENTATION FLAG
1: NOT YET IMPLEMENTED
2: CURRENTLY IMPLEMENTED
0 OR NULL: ALREADY IMPLEMENTED

FIG. 11

| LV NAME | RECALL IMPLEMENTATION FLAG |
|---------|----------------------------|
| LV1     | 0                          |
| LV5     | 1                          |
|         |                            |
|         |                            |
|         |                            |

116

RECALL IMPLEMENTATION FLAG
1: NOT YET IMPLEMENTED
0 OR NULL: ALREADY IMPLEMENTED

FIG. 18

| LV LIST FOR PV1 | | PV REMAINING CAPACITY | EXPORT IMPLEMENTATION FLAG |
|---|---|---|---|
| LV NAME | DATA SIZE | 100 GB (INITIAL VALUE) | 2 |
| LV4 | 70 GB | 30 GB | |
| LV5 | 20 GB | 10 GB | |
| LV1 | 10 GB | 0 GB | |
| | | | |

| LV LIST FOR PV2 | | PV REMAINING CAPACITY | EXPORT IMPLEMENTATION FLAG |
|---|---|---|---|
| LV NAME | DATA SIZE | 100 GB (INITIAL VALUE) | 1 |
| LV2 | 10 GB | 90 GB | |
| | | | |
| | | | |
| | | | |

EXPORT IMPLEMENTATION FLAG
1: NOT YET IMPLEMENTED
2: CURRENTLY IMPLEMENTED
0 OR NULL: ALREADY IMPLEMENTED

LV LIST FOR PV1

| LV NAME | DATA SIZE | PV REMAINING CAPACITY | TVC | EXPORT IMPLEMENTATION FLAG |
|---|---|---|---|---|
| | | 100 GB (INITIAL VALUE) | | |
| LV3 | 90 GB | 10 GB | OFF-CACHE | 1 |
| LV1 | 10 GB | 0 GB | ON-CACHE | 0 |
| | | | | |
| | | | | |
| | | | | |

LV LIST FOR PV2

| LV NAME | DATA SIZE | PV REMAINING CAPACITY | TVC | EXPORT IMPLEMENTATION FLAG |
|---|---|---|---|---|
| | | 100 GB (INITIAL VALUE) | | |
| LV4 | 70 GB | 30 GB | ON-CACHE | 0 |
| LV5 | 20 GB | 10 GB | ON-CACHE | 1 |
| LV2 | 10 GB | 0 GB | ON-CACHE | 1 |
| | | | | |
| | | | | |

EXPORT IMPLEMENTATION FLAG
1: NOT YET IMPLEMENTED
0 OR NULL: ALREADY IMPLEMENTED

CONTROL DEVICE AND CONTROL METHOD

CROSS-REFERENCE TO RELATED APPLICATION

This application is based upon and claims the benefit of priority of the prior Japanese Patent Application No. 2015-150204, filed on Jul. 30, 2015, the entire contents of which are incorporated herein by reference.

FIELD

The embodiment discussed herein is related to a control device and a control method.

BACKGROUND

A virtual tape system including a tape library and a virtual tape device is known. The tape library houses physical volumes (hereinafter, expressed as PVs) such as magnetic tape cartridges or optical disk cartridges.

The virtual tape device is provided between a host device and the tape library and includes a tape volume cache (TVC) storing therein logical volumes (hereinafter, expressed as LVs) serving as volumes recognized by the host device. The TVC is realized by a storage device or the like having, for example, a redundant array of inexpensive disks (RAID) configuration.

As exemplified in FIG. 23, a virtual tape system 100 may perform volume carry-out (export) processing for writing LVs 220 (expressed as an LV1 to an LV3) from a TVC 210 in a virtual tape device 200 to a PV 310 in a tape library 300 and carrying out the relevant PV 310. By performing the export processing, it becomes possible for data of the LVs 220 to be stored outside the tape library 300 or to be used by another tape library.

As exemplified in FIG. 24, a request (export request) for the export processing is issued by a host device 400, another management server, or the like. The export request includes an LV list 410. The LV list 410 is, for example, a text file. The virtual tape device 200 stores the LVs 220 specified in the LV list 410 in a PV 310 for export, as LVs 320, in an order described in, for example, the LV list 410 (see S241 to S243 in FIG. 24).

As exemplified in FIG. 25, the LVs 220 specified in the LV list 410 are in an on-cache state (for example, the LV2 and the LV3) in which data thereof exists in the TVC 210 and in an off-cache state (for example, the LV1) in which data thereof does not exist in the TVC 210.

Regarding the off-cache LV1, the virtual tape device 200 performs recall processing for reading the LV1 from a PV 310 for saving, in which the relevant LV1 is saved (migrated), to the TVC 210 (see S251 in FIG. 25). Then, the virtual tape device 200 writes, to the PV 310 for export, the LV1 read to the TVC 210 by the recall (see S252 in FIG. 25).

On the other hand, regarding the on-cache LV2 and LV3, the virtual tape device 200 directly writes the relevant LV2 and LV3 from the TVC 210 to the PV 310 for export (see S253 and S254 in FIG. 25).

There is known a technique for storing, in response to an export request, data of LVs cached in the TVC, among the LVs serving as export targets, in the PV independently of the order specified in the export request.

Related techniques are disclosed in, for example, Japanese Laid-open Patent Publication No. 2013-161234 and Japanese Laid-open Patent Publication No. 9-160727.

In the above-mentioned export processing, without considering the data sizes of the LVs 220 serving as storage targets, the virtual tape device 200 stores the LVs 220 serving as storage targets, in the specified PV 310 in accordance with the order specified in the LV list 410. Upon sensing that the data size of the LV 220 to be subsequently stored exceeds the remaining capacity of the PV, the virtual tape device 200 terminates the export processing to the relevant PV 310. In this case, an operator specifies another PV 310, thereby performing the export processing starting from the rest of the LV list 410.

For example, as illustrated in FIG. 26, it is assumed that three rolls of the PVs 310 for export (expressed as a PV1, a PV2, and a PV3) are registered and a size available for data storage per roll is 100 GB (bytes) with respect to all the PVs. It is also assumed that the LVs 220 and the order thereof, specified in the LV list 410, are the LV1 to the LV5 and the respective data sizes thereof are 10 GB, 10 GB, 90 GB, 70 GB, and 20 GB (a total data size is 200 GB).

In this case, in the first export processing, the virtual tape device 200 stores the LV1 and the LV2 in the PV1 and comes to an end. The reason is that the data size (90 GB) of the LV3 exceeds the free space (80 GB) of the PV1. In the second export processing, the virtual tape device 200 stores the LV3 in the PV2 and comes to an end. The reason is that the data size (70 GB) of the LV4 exceeds the free space (10 GB) of the PV2. In the third export processing, the virtual tape device 200 stores the LV4 and the LV5 in the PV3, and storing of all the LVs 220 finishes in a state in which the free space of the PV3 is 10 GB.

In the example of FIG. 26, 3 rolls of the PVs 310 each having the data storage size of 100 GB are used to export all the LVs 220 (a total data size: 200 GB) specified in the LV list 410 to the PVs 310.

In this way, depending on an order in which the LVs 220 are set in the LV list 410, PVs 310 more than the number of rolls of the PVs 310 sufficient for storing the total data size of the LVs 220 specified in the LV list 410 is used in some cases.

SUMMARY

According to an aspect of the present invention, provided is a control device including a processor. The processor is configured to receive an execution request for write processing of writing data of logical volumes to second physical volumes. The data of the logical volumes is stored in first physical volumes. The processor is configured to acquire data sizes of the respective logical volumes. The processor is configured to generate write information on basis of the acquired data sizes and free spaces of storage areas of the respective second physical volumes. The write information includes order information and allocation information. The order information indicates an order of writing the data of the logical volumes to the second physical volumes. The allocation information indicates to which second physical volume the data of the respective logical volumes is to be written. The processor is configured to perform, on basis of the write information, control of writing first data of the logical volumes from a cache unit to the second physical volumes. The first data is already cached in the cache unit. The processor is configured to perform control of reading second data of the logical volumes from the first physical volumes to the cache unit. The second data is not yet cached in the cache unit. The processor is configured to optimize the write information in response to completion of the control of reading.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data configuration of an LV information table;

FIG. 5 is a diagram illustrating an example of a data configuration of an LV list;

FIG. 6 is a diagram illustrating an example of a data configuration of a TR-PVG table;

FIG. 7 is a diagram illustrating an example of a data configuration of a sorted-LV list;

FIG. 8 is a diagram illustrating an example of a data configuration of a sorted-LV list;

FIG. 9 is a diagram illustrating an example of a data configuration of a sub-LV list;

FIG. 10 is a diagram illustrating an example of data set in a sub-LV list;

FIG. 11 is a diagram illustrating an example of a data configuration of a sub-LV list (recall);

FIG. 18 is a diagram illustrating an example of data set in a sub-LV list according to a first method of a first modification example;

FIG. 19 is a diagram illustrating an example of data set in a sub-LV list according to a second modification example;

DESCRIPTION OF EMBODIMENT

Hereinafter, an embodiment will be described with reference to drawings. In this regard, however, the embodiment described below is just an exemplification, and there is no intention to exclude various modifications or applications of technologies unspecified in what follows. In other words, the present embodiment may be variously modified and implemented without departing from the scope thereof. Note that a portion to which the same reference symbol is assigned in drawings referenced in the following embodiment indicates the same portion or a similar portion unless otherwise noted.

Embodiment

Figure 1:
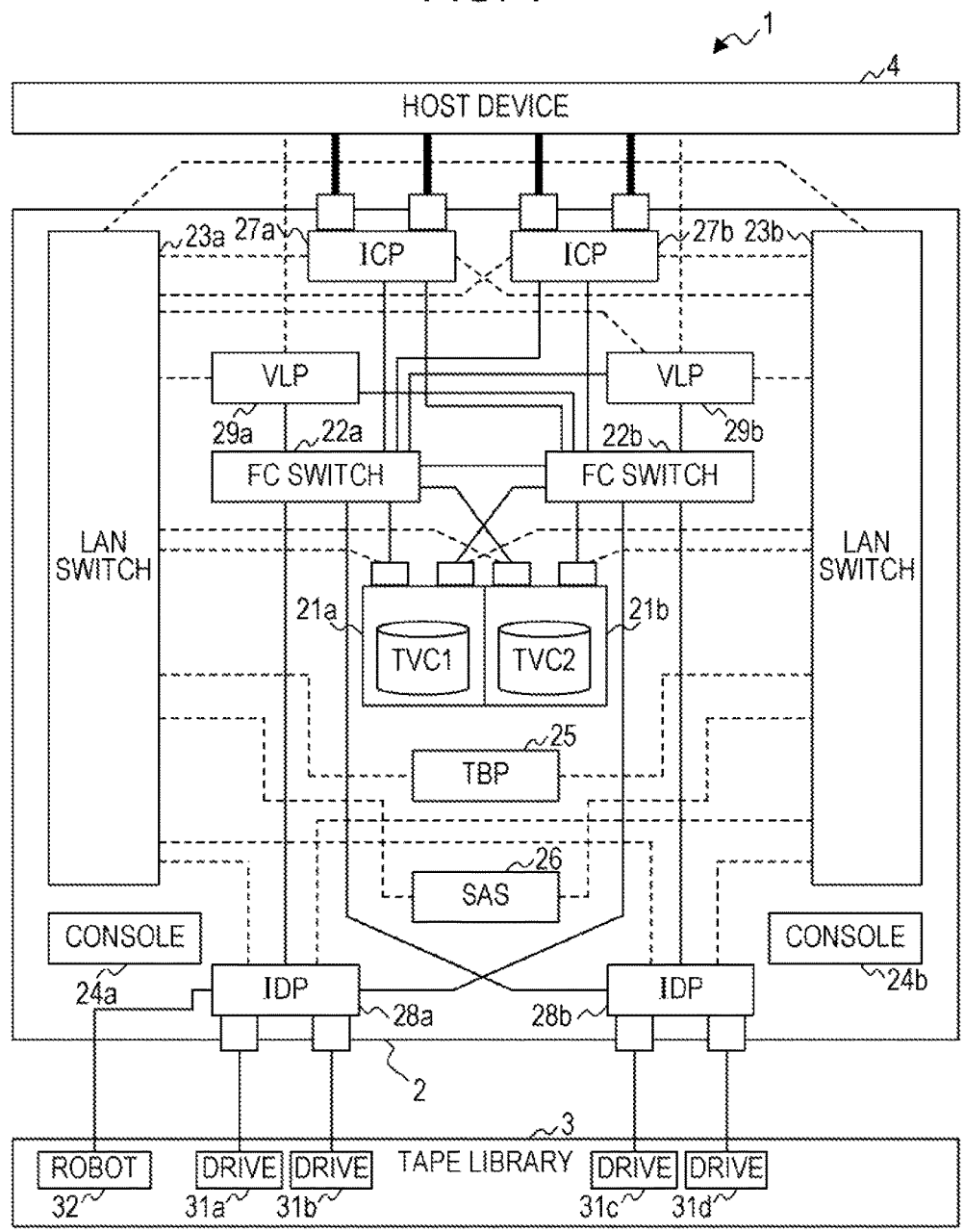
FIG. 1 is a diagram illustrating an example of a configuration of a virtual tape system according to an embodiment.
Figure 2:
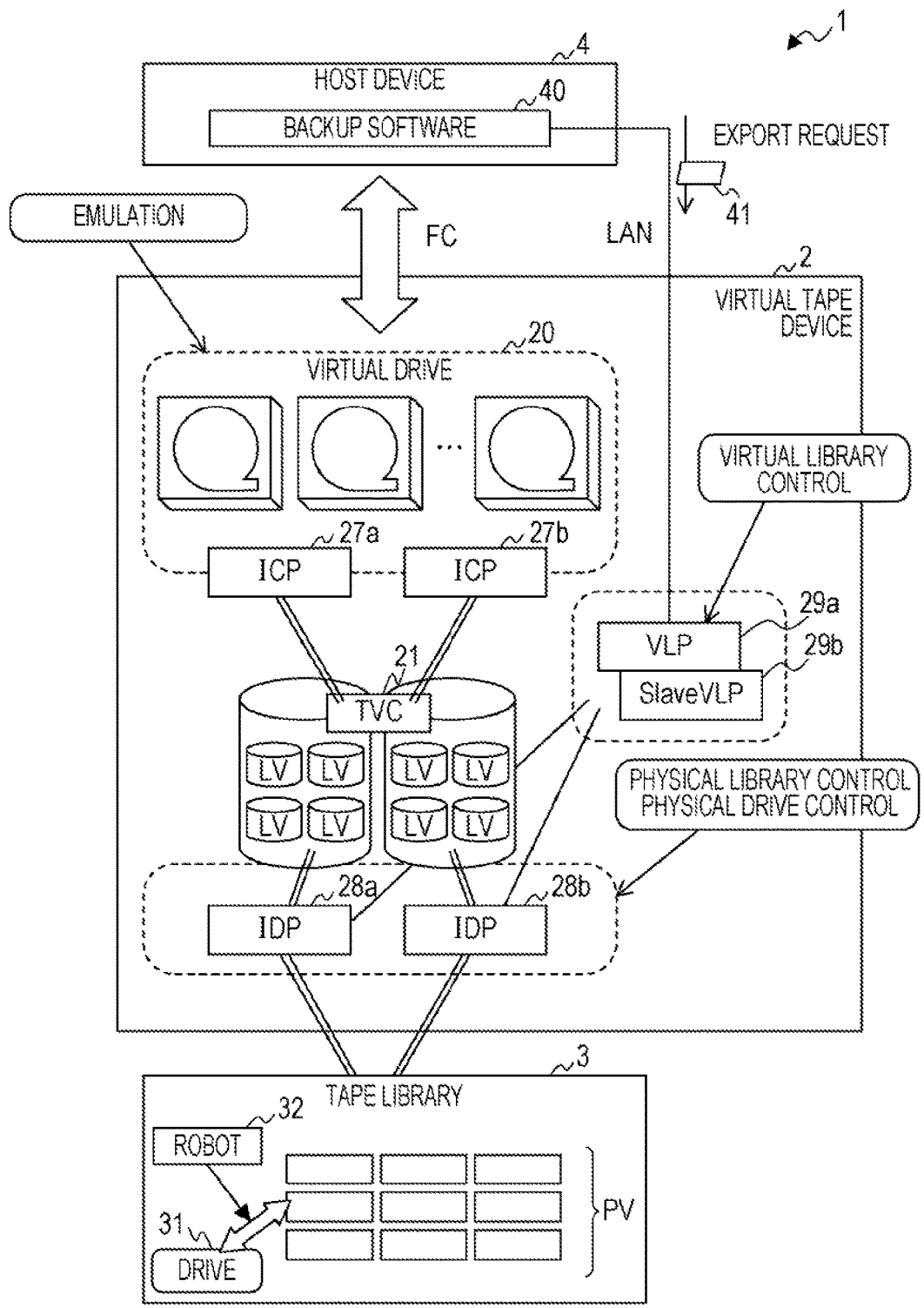
FIG. 2 is a diagram illustrating an example of a functional configuration of a virtual tape system.

FIG. 1 is a diagram illustrating an example of a configuration of a virtual tape system 1 according to an embodiment and illustrates an example of a configuration and a coupling relationship of hardware included in the virtual tape system 1. FIG. 2 is a diagram illustrating an example of a functional configuration of the virtual tape system 1. The virtual tape system 1 is a system for providing a virtual tape library to a host device 4 and includes, for example, a virtual tape device 2 and a tape library 3.

The host device 4 is an example of an information processing device that accesses the tape library 3 via a virtual drive 20 in the virtual tape device 2. Accesses by the host device 4 may include issuing of a request to read data from the virtual drive 20, a request to write data to the virtual drive 20, and an export request, and reception of responses to these requests.

The host device 4 may be, for example, a main frame that executes backup software 40 (see FIG. 2). Hereinafter, for the sake of convenience, a function realized by executing software (a program) is also called software (a program) in some cases. As illustrated in FIG. 2, the backup software 40 may issue the export request to the virtual tape device 2. The export request includes, for example, an export instruction to export data of a logical volume (LV) to a physical volume (PV) for export and an LV list 41.

The tape library 3 may house PVs and to access PVs in accordance with an instruction from the virtual tape device 2. Accesses to the PVs in the tape library 3 may include backing up data of an LV to a PV. The PVs are examples of recording media each storing therein data. As the PVs, magnetic tapes, such as linear tape open (LTO) cartridges, optical disk cartridges, or the like may be cited.

As illustrated in FIG. 1, the tape library 3 includes, for example, plural ("4" in the example of FIG. 1) drives 31a to 31d and one or more ("1" in the example of FIG. 1) robots 32. Each of the drives 31a to 31d is an example of a medium processing device that performs recording, reproduction, and so forth of data on a PV, and the robot 32 is an example of a carrying device that performs picking up and transporting of a medium cartridge, insertion of the medium cartridge into a drive 31, and so forth. The number of the drives 31a to 31d and the number of the robots 32 are exemplifications and arbitrary numbers of these may be provided in the tape library 3.

Note that, among devices whose reference symbols are each expressed by a combination of a numeric character and an alphabet, devices sharing a common numeric character portion may be equipped with a similar function. In the following description, in a case of not being differentiated, devices sharing a common numeric character portion are expressed by simply using the numeric character portion as reference symbols. For example, the drives 31a to 31d are simply expressed as drives 31 in a case of not being differentiated.

The virtual tape device 2 is provided between the host device 4 and the tape library 3 and may issue various instructions to the tape library 3 in response to requests from the host device 4.

As illustrated in FIG. 1, the virtual tape device 2 includes, for example, TVCs 21a and 21b, fibre channel (FC) switches 22a and 22b, local area network (LAN) switches 23a and 23b, and consoles 24a and 24b. In addition, the virtual tape device 2 includes, for example, a tie breaker processor (TBP) 25 and a service access system (SAS) 26. Furthermore, the virtual tape device 2 includes, for example, integrated channel processors (ICPs) 27a and 27b, integrated device processors (IDPs) 28a and 28b, and virtual library processors (VLPs) 29a and 29b.

The TVC 21 is an example of a cache unit and is also an example of a storage device that stores therein data of an LV related to an access between the host device 4 and the tape library 3. The LV is a volume recognizable by the host device 4.

The TVCs 21a and 21b may each include at least one or more storage devices out of a magnetic disk device such as a hard disk drive (HDD) and a semiconductor drive device such as a solid state drive (SSD), and may configure an RAID independently or in cooperation with each other.

The FC switch 22 may switch a communication path between devices in a network such as a storage area network (SAN) coupled via FC cables or the like and may communicably couple these devices with one another. In communication via the FC, for example, transfer of data of an LV, a PV, or the like is performed. In the example of FIG. 1, sections in which FC coupling is established are indicated by solid lines. For example, the FC coupling is established between the TVC 21 and the FC switch 22, between the FC switches 22, between the FC switch 22 and the ICP 27, and between the FC switch 22 and the VLP 29. In addition, the FC coupling may be established between the ICP 27 and the host device 4, between the IDP 28 and the drive 31, and between the IDP 28a and the robot 32.

The LAN switch 23 may switch a communication path between devices in a LAN coupled via LAN cables or the like and may communicably couple these devices with one another. In communication via a LAN, transfer of control information or the like such as commands and data is performed. In the example of FIG. 1, sections in which LAN coupling is established are indicated by dashed lines. For example, each of the TVC 21, the FC switch 22, the TBP 25, the SAS 26, the ICP 27, the IDP 28, and the VLP 29 is LAN-coupled to the LAN switch 23. In addition, the LAN coupling may be established between the VLP 29 and the host device 4.

The console 24 provides a user interface for a device serving as an operation target out of information processing devices such as the ICP 27, the IDP 28, and the VLP 29. The console 24 includes, for example, an input unit such as a keyboard and an output unit such as liquid crystal display (LCD) in addition to a processor such as a central processing unit (CPU) and a memory such as a random access memory (RAM). The console 24 and individual devices may be couple to each other via input-output interfaces such, for example, keyboard, video, and mouse (KVM) switches.

As exemplified in FIG. 1, the FC switches 22, the ICPs 27, the IDPs 28, the VLPs 29, and so forth have redundant configurations. Regarding the FC switches 22, the ICPs 27, and the IDPs 28, in terms of speeding up based on parallel processing, each of the paired devices may operate. Alternatively, one of the paired devices (for example, a device whose reference symbol is assigned with "a": hereinafter, expressed as a "0" system) may operate as an operational system, and the other (for example, a device whose reference symbol is assigned with "b": hereinafter, expressed as a "1" system) may operate as a stand-by system.

As for the VLPs 29a and 29b, one (for example, the VLP 29a serving as the "0" system) may operate as a master, and the other (for example, the VLP 29b serving as the "1" system) may stand by as a slave. In this case, when an abnormality occurs in the VLP 29a serving as a master, the VLP 29b itself serving as a slave may be promoted to a master and to take over processing of the VLP 29a.

In a case of such a redundant configuration, a split brain is likely to occur in which all dedicated communication lines between processors, for example, between the redundant devices are decoupled and a state of one of the processors becomes unclear to the other. In a split brain state, redundant devices detect each other's failures, and, as a result, the operation of a system may become unstable or it may become difficult for the system to operate.

The TBP 25 may monitor operations of devices in each of sites such as the above-mentioned "0"/"1" systems or the like and to control switching between the master (operational system) and the slave (stand-by system). Thus, it is possible to inhibit the split brain from occurring in LAN coupling or SAN coupling between sites or it is possible to solve the split brain after the occurrence thereof.

The SAS 26 may perform a diagnosis, maintenance, and so forth of the virtual tape device 2. Devices serving as targets of processing performed by the SAS 26 include the ICPs 27, the IDPs 28, the VLPs 29, and so forth.

The ICP 27 is equipped with a host bus adapter (HBA) that performs communication with the host device 4, and coupled to the host device 4 by using a storage coupling interface such as, for example, an FC, an FCLINK (registered trademark), or an OCLINK (registered trademark). As the HBA, an interface card compliant with the FC or the like is cited.

Communication of the ICP 27 with the host device 4 may include reception of write data related to a write request from the host device 4, transmission of read data related to a read request from the host device 4, and so forth. The reception of write data and the transmission of read data may include writing of write data to the TVCs 21 and reading of read data from the TVCs 21.

The function of emulating the virtual drive 20 (see FIG. 2) may be realized by the ICPs 27.

The IDP 28 may perform various controls of the TVC 21 and the tape library 3 via the FC in accordance with an instruction from the VLP 29. The control performed by the IDP 28 may include library control and drive control of, for example, the tape library 3 (see FIG. 2).

In the library control, the IDP 28 may control the robot 32 in the tape library 3 in accordance with a mount instruction or an unmount instruction from the VLP 29 and to perform the mount processing or unmount processing of a specified PV.

The drive control may include read control and write control of the PV stored in the tape library 3.

In the read control, the IDP 28 may read data of the specified LV from the PV mounted in the drive 31 in accordance with a read instruction from the VLP 29, and to write the read data of the LV to the TVC 21. Note that it may be said that the LV written to the TVC 21 is in an on-cache state.

In the write control, the IDPs 28 may read data of the specified LV, from the TVC 21 in accordance with a write instruction from the VLPs 29, and to write the read data of the LV to the PV mounted in the drive 31. In the write control, after the data of the LV is read from the TVC 21, the relevant data may be deleted from the TVC 21. Note that it may be said that the LV whose data is deleted from the TVC 21 is in an off-cache state.

In other words, the IDP 28 may perform store processing for storing data of the LV stored in the TVC 21 into the PV in the tape library 3, and restore processing for reading and restoring data of the LV from the PV in the tape library 3 into the TVC 21.

The VLP 29 is coupled to the host device 4 via a network interface such as a LAN card and may perform communication with the host device 4 and control resource management and so forth of the virtual tape device 2.

The communication of the corresponding VLP 29 with host device 4 may include reception of access requests such as a read request, a write request, and an export request, transmitted to the virtual drive 20 by the host device 4, and transmission of responses to the access requests.

For example, in response to a read request from the host device 4, the VLP 29 may issue, to the IDP 28, a restore instruction to restore data of the LV serving as a read target into the virtual drive 20.

For example, in response to a write request or an export request from the host device 4, the VLP 29 may issue, to the IDP 28, a store instruction to store data of the LV serving as a write target or an export target into the PV. In a case of "off-cache", the store instruction may include a restore instruction to preliminarily put data of the LV serving a target into "on-cache".

In other words, it may be said that the VLP 29 is in charge of an interface related to control of the drives 31, the robot 32, and so forth in the tape library 3 for the host device 4 and performs control of the virtual drive 20 provided by the ICP 27 in response to a request from the host device 4 (see FIG. 2).

The resource management of the virtual tape device 2 performed by the VLP 29 may be performed by managing a database related to the LVs and the PVs. The database managed by the VLP 29 will be described later.

Next, an example of a functional configuration relating to export control performed by the virtual tape device 2, in particular, the VLPs 29 will be described with reference to FIG. 3.

Figure 3:
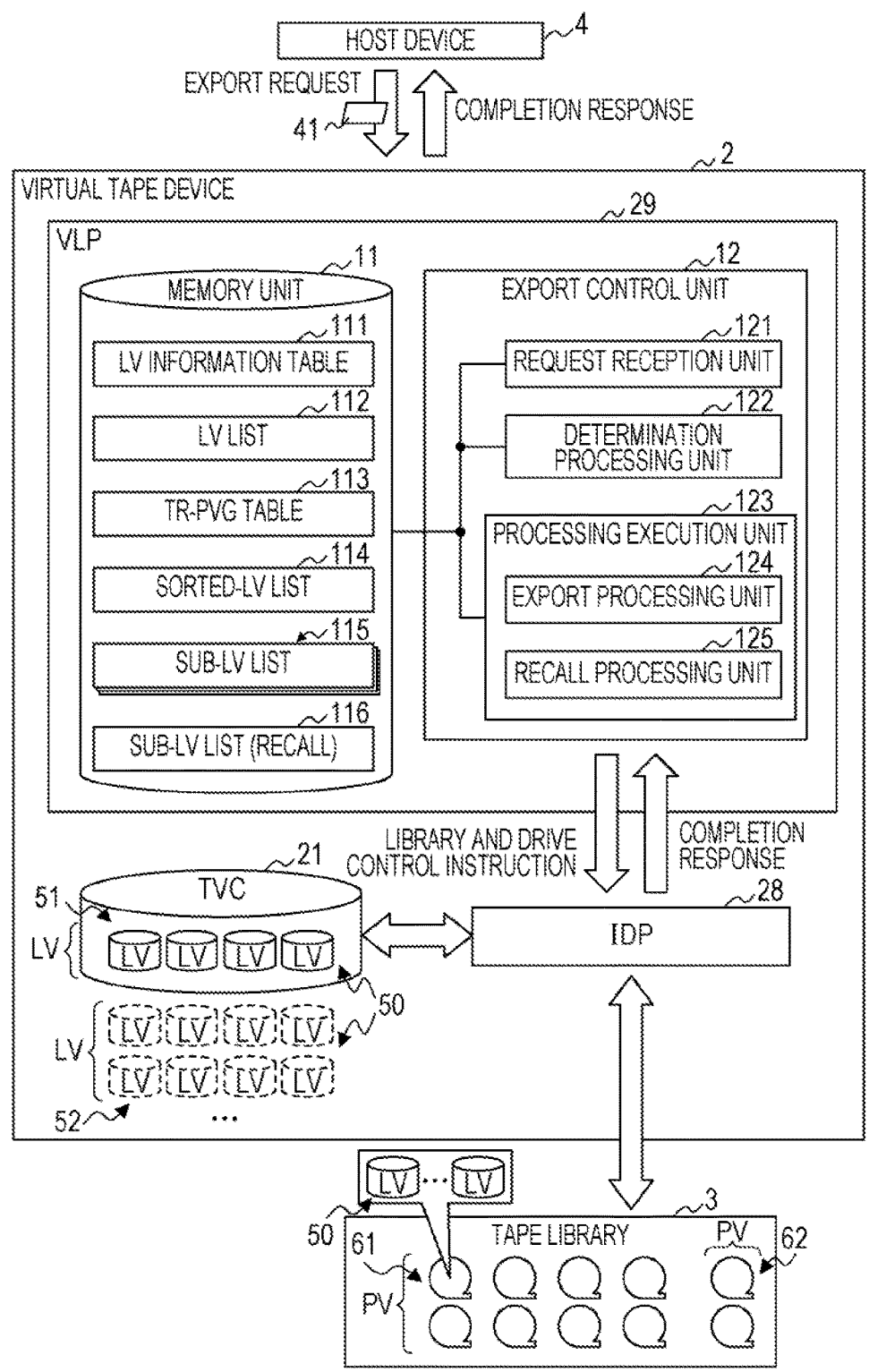
FIG. 3 is a diagram illustrating an example of a functional configuration relating to export control performed by a virtual tape device.

Focusing on export control performed by the virtual tape device 2, as illustrated in FIG. 3, for example, the VLP 29 includes a memory unit 11 and an export control unit 12. The memory unit 11 may be realized by a memory included in the VLP 29 and the export control unit 12 may be realized by a CPU included in the corresponding VLP 29 by executing a program.

In the following description, the on-cache LV stored in the TVC 21 is expressed as an LV 51, the off-cache LV, which is not stored in the TVC 21, is expressed as an LV 52, and the LVs 51 and 52 are collectively expressed as LVs 50. In other words, it may be said that the LVs 50 are all LVs managed by the virtual tape device 2. Furthermore, a PV for saving (for data accumulation) storing therein data of the LV 50 is expressed as a PV 61 and a PV for export, provided in the tape library 3, is expressed as a PV 62.

For example, the memory unit 11 includes storage areas storing therein respective pieces of information such as an LV information table 111, an LV list 112, a transfer-physical volume group (TR-PVG) table 113, a sorted-LV list 114, a sub-LV list 115, and a sub-LV list (recall) 116. The pieces of information stored in the memory unit 11 will be described within a description of the export control unit 12.

The export control unit 12 includes, for example, a request reception unit 121, a determination processing unit 122, and a processing execution unit 123.

The request reception unit 121 may perform reception processing of an export request received from the host device 4. The reception processing may include acquisition processing of information related to the export request and calculation processing of the number of rolls of the PVs used for determination processing performed by the determination processing unit 122 described later.

In the acquisition processing, the request reception unit 121 may acquire, for example, a data size of an LV 50 serving an export target and a data storage size per one roll of the PV 62 from the LV information table 111 (see FIG. 4) and the TR-PVG table 113 (see FIG. 6), respectively.

FIG. 4 is a diagram illustrating an example of a data configuration of the LV information table 111. As illustrated in FIG. 4, in each entry of the LV information table 111, an LV name of the LV 50, a PV name of the PV 61 corresponding to the LV 50, a cache state of the LV 50 in the TVC 21, a data size of the LV 50, and a final update time of the LV 50 are set, for example. In a case where a state of the LV 50 or the TVC 21 changes in response to a write request, a read request, or the like from the host device 4, the LV information table 111 may be referenced and updated by the VLP 29.

Identification information such as, for example, an identifier (ID) capable of uniquely identifying the LV 50 is set in the LV name, and identification information of the PV 61 in which data of the LV 50 is stored is set in the PV name. Information indicating, for example, "on-cache" or "off-cache" is set in the cache state in the TVC. In other words, it may be said that the LV information table 111 is information indicating a write destination of data of the LV 50 among the TVC 21 and the PVs 61.

In the acquisition processing of the data size of the LV 50, the request reception unit 121 may reference the LV information table 111 exemplified in FIG. 4 and to acquire a corresponding data size for each of the LVs 50 included in the LV list 41. At this time, the LV list 112, in which an item of the acquired data size is added to the LV list 41, may be generated by the request reception unit 121 and the information of the LV list 112 may be stored in the storage area of the memory unit 11.

FIG. 5 is a diagram illustrating an example of a data configuration of the LV list 112. As illustrated in FIG. 5, in each entry of the LV list 112, an LV name and a data size of the LV 50 are set, for example. In the example of FIG. 5, the LVs 50 and a setting order specified in the LV list 41 are the LV1 to the LV5, and the respective data sizes thereof are 10 GB, 10 GB, 90 GB, 70 GB, and 20 GB (a total data size is 200 GB).

FIG. 6 is a diagram illustrating an example of a data configuration of the TR-PVG table 113. As illustrated in FIG. 6, in each entry of the TR-PVG table 113, identification information of a group of export, a PV name of a PV 62 used for export, and the data storage size of the PV 62 are set, for example. The identification information of a group of export is, for example, an identifier associated with an export request, the LV list 41, or the like, received from the host device 4. The data storage size is a data size of data which may be stored in the PV 62. In the example of FIG. 6, each of the data storage sizes of the PV1 and PV2 is 100 GB.

The TR-PVG table 113 indicates a pool of the PVs 62 for export and the PVs 62 for export may be registered in advance by an operator or the like who conducts the export. In addition, in an export instruction from the host device 4, the group or the PV 62, which is already registered in the TR-PVG table 113, may be specified by the operator.

In other words, the request reception unit 121 is an example of an acquisition unit that acquires the data sizes of the respective LVs 50 upon receiving an execution request for write processing for writing data of the LVs 50 stored in the first PVs 61 into the second PVs 62.

In the calculation processing of the number of rolls of the PVs, in terms of each of a storage capacity and a storing order, the request reception unit 121 may calculate the number of rolls of the PVs used for export, based on the data sizes of the LVs 50 and the data storage sizes of the PVs 62, acquired in, for example, the acquisition processing.

The number (X) of rolls of the PVs used in terms of the storage capacity is a value indicating the number of the PVs 62 sufficient for storing the total data size of the LVs 50 specified in the LV list 41 and is, for example, an integer value.

The value of "X" may be obtained by, for example, totaling data sizes of all the LVs 50 specified in the LV list 41, dividing the total value by a data storage size per one roll of the PV 62, and rounding up the result of the division to the whole number. The data storage size per one roll of the PV 62 may be obtained by, for example, calculating the average value of the data storage sizes of the PVs 62 included in a group for export.

The number of rolls of the PVs (Y) used in terms of the storing order is a value indicating the number of the PVs 62 used in a case where the export is performed in the setting order of the LVs 50 set in the LV list 41, and the number of rolls of the PVs (Y) is, for example, an integer value.

The value of "Y" may be obtained by, for example, the following procedures of (a) to (c).

(a) Total the data sizes of the LVs 50 in accordance with the setting order of the LVs 50 within the LV list 41, and count by +1 in a case where a total value exceeds the data storage size per one roll of the PV 62.

(b) Total the data sizes of the LVs 50 starting with the LV 50 that has caused the excess in accordance with the setting order of the LVs 50 within the LV list 41, and count by +1 in a case where a total value exceeds the data storage size.

(c) Perform (b) for all the LVs 50 specified in the LV list 41, and obtain a final count value (an integer value) as the number "Y" of rolls of the PVs.

Based on the numbers "X" and "Y" of rolls of the PVs calculated by the request reception unit 121, the determination processing unit 122 may perform determination processing of whether or not to perform optimization of export and perform optimization preprocessing in a case of determining that the optimization is to be performed.

The optimization of export includes controlling, based on the data sizes of the LVs 50 serving as export targets, the execution order in the export processing of the LVs 50 so that the number of the PVs 62 used for the export processing is optimized. The optimized number of the PVs 62 may be the number of the PVs 62 sufficient for storing the total data size of the LVs 50 specified in the LV list 41 in terms of, for example, the storage capacity.

As described above, plural LVs 50 serving as export targets may be specified in the LV list 41 transmitted by the host device 4. However, the setting order of the LVs 50 in the LV list 41 does not restrict an order of the LVs 50 being stored in the PVs 62.

In other words, in the export processing, it is enough that the specified LVs 50 are stored in the PVs 62 for export, and controlling the execution order of the export processing of the LVs 50 by optimization of export is not contrary to an export instruction requested by the host device 4.

In the determination processing of optimization, the determination processing unit 122 compares the number "X" of rolls of the PVs and the number "Y" of rolls of the PVs with each other, and in a case where "Y" is larger than "X", it may be determined that the optimization is to be performed.

In a case where it is determined that the optimization is to be performed, the determination processing unit 122 may sort, as the optimization preprocessing, the LV list 112 in descending order based on data sizes, thereby creating the sorted-LV list 114 ("LVLIST-Sorted") and to store the information of the sorted-LV list 114 in the storage area of the memory unit 11.

FIG. 7 is a diagram illustrating an example of a data configuration of the sorted-LV list 114. In the example of FIG. 7, the sorted LVs 50 are LV3, LV4, LV5, LV1, and LV2, and the respective data sizes thereof are 90 GB, 70 GB, 20 GB, 10 GB, and 10 GB. As exemplified in FIG. 8, a sorted-LV list 114' in which information indicating "on-cache" or "off-cache" for each of the LVs 50 is further set in each entry may be created.

In a case where "Y" is less than or equal to "X" (in reality, in a case where "X" and "Y" are equal to each other) in the determination processing, even if the export processing of the LVs 50 is performed in an order specified in the LV list 41 or the LV list 112, the number of rolls of the PVs to be used is minimized. In this case, the determination processing unit 122 may determine that the optimization is not to be performed.

As described above, the request reception unit 121 and the determination processing unit 122 correspond to an example of a determination unit that determines, based on the data size of each of the LVs 50 and the free space of the storage area of each of the second PVs 62, whether or not to generate the sub-LV lists 115 described later. In this determination, the determination unit may calculate the number of the second PVs 62 used in a case where processing of writing to the second PVs 62 in the setting order of the LVs 50 in an export request is performed. In addition, in a case where the calculated number is larger than a value obtained by dividing the total value of the free spaces of the storage areas of the respective second PVs 62 by the total value of the data sizes of the LVs 50, the determination unit may determine that the sub-LV lists 115 are to be generated.

In accordance with a determination result of the determination processing unit 122, the processing execution unit 123 may execute the export processing and recall processing based on the LV list 112 or the sorted-LV list 114. Therefore, the processing execution unit 123 includes, for example, an export processing unit 124 and a recall processing unit 125.

In a case where the determination processing unit 122 determines that the optimization is not to be performed, for example, based on the setting order of the LVs 50 within the LV list 41, the export processing is performed by the export processing unit 124 and the recall processing is performed as appropriate by the recall processing unit 125 in the processing performed by the processing execution unit 123.

For example, as described above, the processing execution unit 123 may issue, based on the LV list 112, an instruction to store the LVs 50 serving as export targets into the PVs 62 to the IDP 28.

In a case where the export targets are the on-cache LVs 51, the store instruction may include, for example, an instruction to mount the PVs 62 on the respective drives 31, an instruction to write the LVs 51 from the TVC 21 to the PVs 62, an instruction to unmount the PVs 62 after the writing, and so forth. These instructions related to "on-cache" may be issued by the export processing unit 124.

In a case where the export targets are the off-cache LVs 52, the store instruction may include a restore instruction for loading data of the off-cache LVs 52 into the TVC 21 before the mount instruction in a case of "on-cache". In the same way as in a case of the read request, the restore instruction may include an instruction to mount, on the drives 31, the respective PVs 61 storing therein data of the LVs 52, an instruction to read data of the LVs 52 from the PVs 61 to the TVC 21, an instruction to unmount the PVs 61 after the reading, and so forth. These instructions related to "off-cache" may be issued by the recall processing unit 125.

Determination of whether the export targets are the on-cache LVs 51 or the off-cache LVs 52 may be performed by referencing the LV information table 111. In addition, the PVs 62 for export may be identified by referencing the TR-PVG table 113 with respect to a group specified in the export request.

On the other hand, in a case where the determination processing unit 122 determines that the optimization is to be performed, in the processing performed by the processing execution unit 123, the sub-LV list 115 ("Sub-LVLIST-PVx": "X" is an integer) for each of the PVs 62 is generated based on, for example, the sorted-LV list 114, and the export processing is performed based on the sub-LV lists 115.

In the generation of the sub-LV lists 115, the processing execution unit 123 generates the sub-LV list 115 for each of the PVs 62 so as to sort the LVs 50 into rolls of the PVs 62 in the order of the LVs 50 specified in, for example, the sorted-LV list 114.

As an example, the processing execution unit 123 selects an LV 50 from the sorted-LV list 114 in a setting order and registers the selected LV 50 in the sub-LV list 115 corresponding to a PV 62 whose free space is the largest among the rolls of the PVs 62.

FIG. 9 illustrates an example of a data configuration of the sub-LV list 115. As illustrated in FIG. 9, in an entry of the sub-LV list 115 for each of the PVs 62, an LV name, a data size of the LV 50, a PV remaining capacity, and an export implementation flag are set, for example.

The LV name and the data size are the same as those set in the sorted-LV list 114. The PV remaining capacity is a value indicating the remaining capacity of the PV 62, and is set with a value obtained by subtracting the data size of the registered LV 50 from the remaining capacity of the PV 62, while defining the data storage size as an initial value. The PV remaining capacity is calculated and set by the processing execution unit 123, for example, every time the LV 50 is registered in the sub-LV list 115. The export implementation flag is an example of information indicating an implementation state of export based on the sub-LV lists 115. For example, the export implementation flag is set to "1" in a case of not yet being implemented, to "2" in a case of being currently implemented, and to "0", "NULL", or the like in a case of being already implemented.

In other words, the sub-LV list 115 is an example of write information related to the order of writing the LVs 50 to the second PVs 62 and the second PVs 62 that serve as write destinations of data of the respective LVs 50. The processing execution unit 123 is an example of a generation unit that generates the sub-LV lists 115, based on the data sizes of the respective LVs 50 acquired by the request reception unit 121 and the free spaces of the storage areas of the respective second PVs 62.

For example, in a case where, the sub-LV lists 115 corresponding to the PV1 and the PV2 are generated based on the sorted-LV list 114 illustrated in FIG. 7, the LVs 50 are registered in order starting from the LV3 set in the beginning of the list, as follows.

LV3: Since the remaining capacities of the PV1 and the PV2 are each 100 GB and are identical to each other, the LV3 is registered in, for example, the sub-LV list 115 for the PV1 having a lower number (the remaining capacity of the PV1: 100 GB−90 GB=10 GB).

LV4: Since the remaining capacity of the PV1 is 10 GB and the remaining capacity of the PV2 is 100 GB, the LV4 is registered in the sub-LV list 115 for the PV2 whose remaining capacity is larger (the remaining capacity of the PV2: 100 GB−70 GB=30 GB).

LV5: Since the remaining capacity of the PV1 is 10 GB and the remaining capacity of the PV2 is 30 GB, the LV5 is registered in the sub-LV list 115 for the PV2 whose remaining capacity is larger (the remaining capacity of the PV2: 30 GB−20 GB=10 GB).

LV1: Since the remaining capacities of the PV1 and the PV2 are each 10 GB and are identical to each other, the LV1 is registered in, for example, the sub-LV list 115 for the PV1 having a lower number (the remaining capacity of the PV1: 10 GB−10 GB=0 GB).

LV2: Since the remaining capacity of the PV1 is 0 GB and the remaining capacity of the PV2 is 10 GB, the LV2 is registered in the sub-LV list 115 for the PV2 whose remaining capacity is larger (the remaining capacity of the PV2: 10 GB−10 GB=0 GB).

Note that, in the sub-LV list 115 illustrated in FIG. 9, it is assumed that all the LVs 50 serving as export targets are on-cache. In this case, the recall processing performed by the recall processing unit 125 is not executed, and the export processing based on the sub-LV list 115 is executed for each of the PVs 62 by the export processing unit 124.

On the other hand, in a case where the export targets include the off-cache LV 52, selection of the LVs 50 to be registered in the sub-LV list 115 or the PVs 62 to serve as registration destinations, implementation of the export processing and the recall processing based on the sub-LV lists 115, may be realized by any one of many methods. Hereinafter, an example will be described. In the following description, for example, it is assumed that the LV1 and the LV5 is in the off-cache state among the LVs 50 in the sorted-LV list 114 illustrated in FIG. 7.

The selection of the LVs 50 from the sorted-LV list 114 may be performed while prioritizing the on-cache LVs 51. For example, as illustrated in FIG. 10, the processing execution unit 123 allocates the on-cache LV3, LV4, and LV2 to the PV1, PV2, and PV2, respectively, based on the sorted-LV list 114 or the sorted-LV list 114'.

On the other hand, the off-cache LV5 and LV1 excluded from assignment targets of the sub-LV list 115 are set in, for example, the sub-LV list (recall) 116 ("Sub-LVLIST-recall") serving as an off-cache LV list.

FIG. 11 is a diagram illustrating an example of a data configuration of the sub-LV list (recall) 116. As illustrated in FIG. 11, for example, an LV name and a recall implementation flag are set in each entry of the sub-LV list (recall) 116. The LV name is identification information of the off-cache LV 52. The recall implementation flag is an example of information indicating an implementation state of recall based on the sub-LV list (recall) 116. For example, the recall implementation flag is set to "1" in a case of not yet being implemented, and to "0", "NULL", or the like in a case of being already implemented.

For example, the processing execution unit 123 performs the export processing by the export processing unit 124 by using the sub-LV list 115 and performs the recall processing by the recall processing unit 125 by using the sub-LV list (recall) 116. Each of the export processing and the recall processing may be progressed by plural processes in parallel.

The recall processing of the LVs 52 in the sub-LV list (recall) 116 may be started in parallel with, for example, the export processing. Thus, an export operation does not have to be stopped during a recall operation, and it is possible to suppress prolongation of an operation time of the export processing, caused by an occurrence of the recall processing.

In the parallel implementation of the export processing and the recall processing, every time the recall of one of the LVs 50 (LVs 52) in the sub-LV list (recall) 116 is completed, the recall processing unit 125 may send back (reregister), to the sorted-LV list 114, the LV name of the LV 50 on which recall is completed (which is put into "on-cache").

Upon detecting that the LV 50 is sent back to the sorted-LV list 114, the export processing unit 124 may review the order of the LVs 50 on which export processing is not yet implemented or is currently implemented, to regenerate (reorganize) the sub-LV list 115, and to start the export processing based on the new sub-LV list 115.

In this way, in the parallel implementation of the export processing and the recall processing, sending back of the LVs 50 on which recall is completed and regeneration of the sub-LV list 115 are performed until the export processing of all the LVs 50 including the off-cache LVs 52 is completed.

In other words, the export processing unit 124 is an example of a write control unit that performs control of writing data of the LVs 50, which has been cached in the TVC 21, from the TVC 21 to the PVs 62 serving as write destinations on the basis of the sub-LV list 115. The recall processing unit 125 is an example of a read control unit that performs control of reading data of the LV 52, which has not been cached in the TVC 21, from the first PV 61 to the TVC 21. Furthermore, the export processing unit 124 is an example of an optimization unit that performs optimization of the sub-LV list 115 used for control of export, in response to completion of control performed by the recall processing unit 125.

The implementation state of recall of each of the LVs 52 may be determined by referencing the value of the corresponding recall implementation flag in the sub-LV list (recall) 116.

Determination of whether the LV 50 is sent back to the sorted-LV list 114 is implemented by the export processing unit 124 at a predetermined timing. As the predetermined timing, for example, a timing at which the export processing is completed for one of the sub-LV lists 115 may be cited. The implementation state of the export processing for each of the sub-LV lists 115 may be determined by referencing the value of the corresponding export implementation flag. The export implementation flag is updated by the export processing unit 124 every time an implementation state changes.

In order to simultaneously process export and recall in parallel, it is desirable that each of the export processing and the recall processing may use one or more free drives 31. In a case where there is no free drive 31, the export processing unit 124 or the recall processing unit 125 may, for example, wait for a free drive 31.

In a case where a prioritized job requests to use the drives 31 during the operation of the export processing or the recall processing, the export processing unit 124 or the recall processing unit 125 may suspend its processing and to resume the processing from the point of the suspension when the drives 31 are released. The suspension of the processing includes, for example, storing, in a memory, information to resume the processing and releasing the drives 31. The information to resume the processing may include, for example, information indicating the sub-LV list 115 corresponding to the drives 31 used before the suspension, information indicating the LV 51 which is set in the sub-LV list 115 and export thereof is suspended, and so forth.

Figure 12:
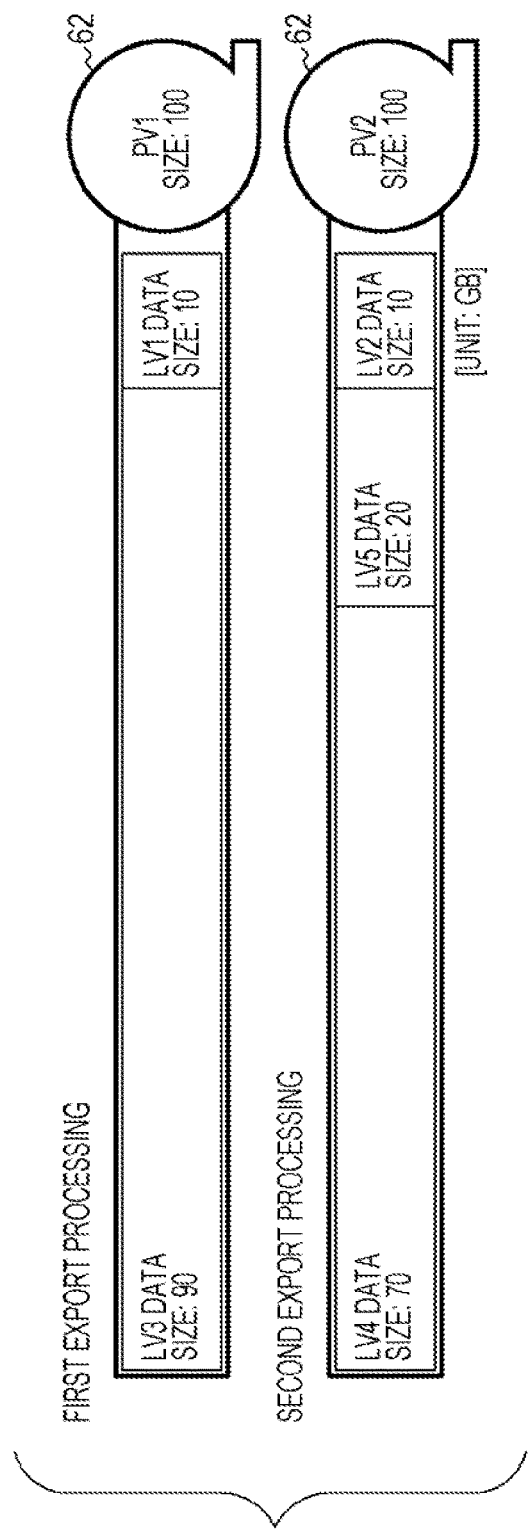
FIG. 12 is a diagram illustrating an example of a state in which LVs are stored in PVs for export.

As described above, regardless of the order of the LVs 50 set in the LV list 41, the processing execution unit 123 may export the LVs 50 to the optimum PVs 62, in terms of the data sizes of the LVs 50. For example, as illustrated in FIG. 12, the export processing of each of the PV1 and the PV2 is implemented with an optimum combination of the LVs 50 falling within the data storage size of each PV 62.

Accordingly, it is possible to keep the number of the PVs 62 used for export to a number sufficient for storing the total data size of the LVs 50 and to suppress the extra consumption of the PVs 62. In addition, since the remaining capacities of the PVs 62 may be suppressed and minimized as far as possible, it is possible to realize efficient utilization of resources.

Based on the free spaces of the PVs 62 and the data sizes of the LVs 50 serving as export targets, it is possible to dynamically adjust the storage destinations and the storing order of the LVs 50. Therefore, at the time of implementing export, a person who conducts export does not have to pay attention to the free spaces of the PVs 62, thereby enhancing convenience.

Next, an example of an operation of export control in the virtual tape system 1 configured as described above will be described with reference to FIG. 13 to FIG. 16.

Figure 13:
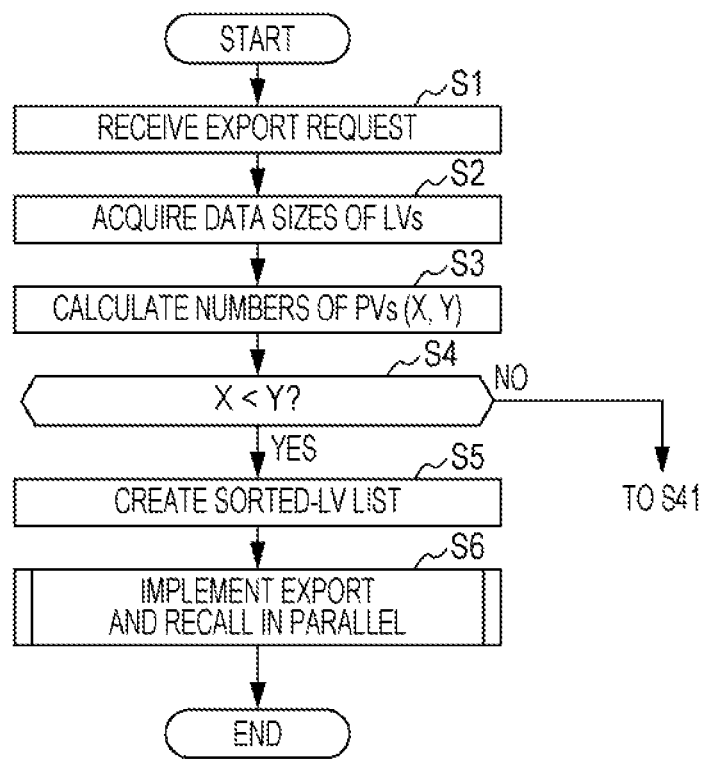
FIG. 13 is a flowchart illustrating an example of an operation of export control in a virtual tape system according to an embodiment.

As illustrated in FIG. 13, upon receiving, from the host device 4, an export request including the LV list 41 (S1), the request reception unit 121 in the VLP 29 acquires the data sizes of the LVs 50 specified in the received LV list 41 (S2). The data sizes of the LVs 50 are acquired from the LV information table 111. The request reception unit 121 adds the acquired data sizes to the LV list 41, thereby generating the LV list 112, and stores information of the LV list 112 in the storage area of the memory unit 11.

The request reception unit 121 separately calculates a number "X" of the PVs 62 used for export in terms of the storage capacity and a number "Y" of the PVs 62 used for export in terms of the storing order (S3). The data sizes of the LVs 50 serving as export targets and the data storage sizes of the PVs 62 are acquired from the LV list 112 and the TR-PVG table 113, respectively.

Next, the determination processing unit 122 determines whether or not "Y" calculated by the request reception unit 121 is larger than "X" (S4), and in a case where it is determined that "Y" is less than or equal to "X" (in fact, "Y"="X") (S4: No), the processing makes a transition to S41 in FIG. 16. In a case where the processing proceeds from S4 to S41 in FIG. 16, storing of the LVs 50 into the PVs 62 may be performed based on the setting order of the LVs 50 set in the LV list 41 or the LV list 112. The description with reference to FIG. 16 will be provided later.

In a case where, in S4, it is determined that "Y" is larger than "X" (S4: Yes), in order to optimize export, the determination processing unit 122 performs sorting, based on the data sizes of the LVs 50 in the LV list 112, and generates the sorted-LV list 114 (S5). Based on the sorted-LV list 114, the processing execution unit 123 implements the export processing and the recall processing in parallel (S6), and the processing finishes.

Next, examples of operations of the export processing and the recall processing, performed by the processing execution unit 123, will be described with reference to FIG. 14 and FIG. 15. Note that S11 illustrated in FIG. 14 and S31 illustrated in FIG. 15 may be started in parallel by different processes.

Figure 14:
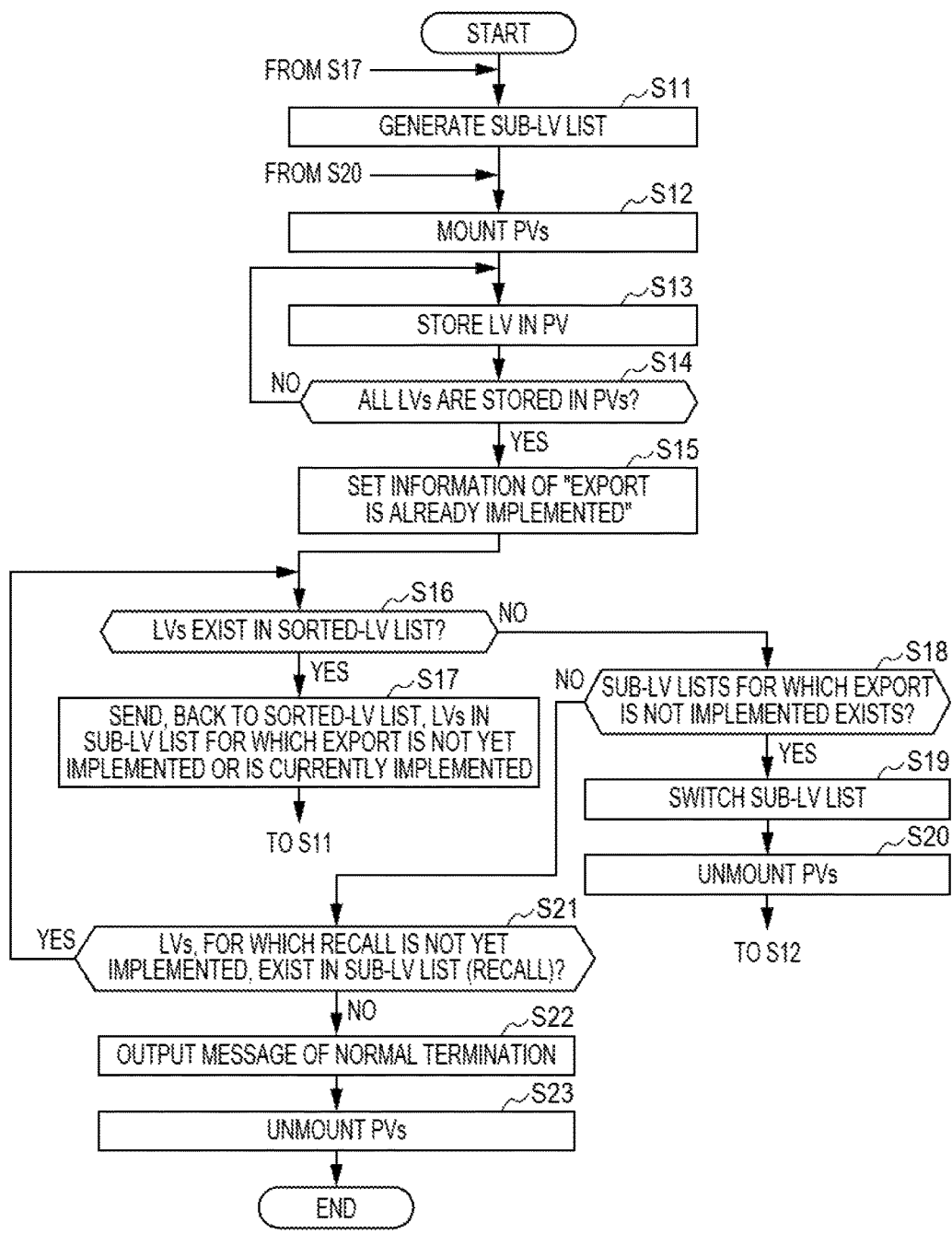
FIG. 14 is a flowchart illustrating an example of an operation of export processing in a virtual tape system according to an embodiment.

To describe the export processing first, as illustrated in FIG. 14, the processing execution unit 123 allocates, based on a predetermined allocation condition, the individual LVs 50 in the sorted-LV list 114 generated by the determination processing unit 122 to the PVs 62, and generates the sub-LV list 115 (S11). At this time, as information indicating that export is not yet implemented, the export implementation flag in the sub-LV list 115 is set to, for example, "1".

The predetermined allocation condition may include a selection condition of the LVs 50 and a selection condition of the PVs 62. As the selection condition of the LVs 50, for example, the on-cache LVs 51 are selected in the setting order of the LVs 50 in the sorted-LV list 114. As the selection condition of the PVs 62, for example, the PVs 62 which are already registered in the TR-PVG table 113 and whose free spaces are the largest are selected.

Next, the export processing unit 124 instructs the IDP 28 to mount the specified PVs 62 for export on the drives 31 in the tape library 3, and the IDP 28 instructs the robot 32 to mount the PVs 62 (S12). The PVs 62 mounted on the drives 31 are, for example, preliminarily registered in the TR-PVG table 113 by the operator.

When the mounting of the PVs 62 is completed, the export processing unit 124 selects one of the LVs 51 in the sub-LV list 115 in, for example, the setting order, for the corresponding drive 31 via the IDP 28, and causes the relevant LV 51 to be stored in the corresponding PV 62 (S13). At this time, in the sub-LV list 115, as information indicating that export is currently implemented, the export implementation flag is set to, for example, "2".

When storing of the relevant LV 51 in the corresponding PV 62 is completed, the export processing unit 124 determines whether or not all the LVs 51 in the sub-LV list 115 are stored in the PVs 62 (S14). In a case where some of the LVs 51 in the sub-LV list 115 are not yet stored in the PVs 62 (S14: No), the processing makes a transition to S13.

In a case where all the LVs 51 in the sub-LV list 115 are stored in the PVs 62 (S14: Yes), the export processing unit 124 sets, in the sub-LV list 115 for which the export processing is completed, information indicating that export is already implemented (S15). As the information indicating that export is already implemented, the export implementation flag is set to, for example, "NULL", or the like.

Next, the export processing unit 124 determines whether or not any LVs 51 exist in the sorted-LV list 114 (S16). This determination corresponds to check of whether or not any LVs 52 after completion of recall are sent back by the recall processing performed by the recall processing unit 125. In other words, this determination corresponds to check of whether or not any LVs 51, on which recall is completed and which may be exported, exist.

In a case where, in S16, it is determined that some LVs 51 exist in the sorted-LV list 114 (S16: Yes), the export processing unit 124 sends, back to the sorted-LV list 114, the LVs 51 in the sub-LV list 115 in which the information indicating that export is not yet implemented or is currently implemented is set (S17). The processing makes a transition to S11, and the export processing unit 124 assigns the LVs 51 for which export is not yet implemented to the PVs 62 on which export is not yet implemented, thereby regenerating the sub-LV list 115.

In this way, based on the data sizes of the LVs 50 for which control performed by the recall processing unit 125 is completed, the export processing unit 124 may reallocate write destinations of the respective LVs 50 in the sub-LV list 115. Note that targets of the reallocation are the LVs 50 for which control of recall performed by the recall processing unit 125 is completed and the LVs 50 for which control of export performed by the export processing unit 124 is not completed.

The LVs 51 sent from the sub-LV list 115, for which export is currently implemented, back to the sorted-LV list 114 may be all the LVs 51 in the sub-LV list 115 and may be limited to the LVs 51 that are not yet stored in the PVs 62. In this case, in the sub-LV list 115, the export implementation flag may be provided for each of the LVs 51.

In a case where, in S16, it is determined that no LV 51 exists in the sorted-LV list 114 (S16: No), the export processing unit 124 determines whether or not any sub-LV lists 115 for which export is not yet implemented exist (S18).

In a case where it is determined that some sub-LV lists 115 exist (S18: Yes), the export processing unit 124 switches processing targets from the sub-LV lists 115 for which export is already implemented to the sub-LV lists 115 for which export is not yet implemented (S19). The export processing unit 124 causes, via the IDP 28, the robot 32 to unmount the PVs 62 for which export is completed from the drives 31 (S20), and the processing makes a transition to S12.

In a case where it is determined that no sub-LV list 115 for which export is not yet implemented exists (S18: No), the export processing unit 124 determines whether or not any LVs 52, for which recall is not yet implemented, exist in the sub-LV list (recall) 116 (S21). This determination corresponds to check of whether or not the entire recall processing is completed.

The determination in S21 may be performed by checking whether or not any LVs 52, whose recall implementation flag indicates not yet being implemented, exist in the sub-LV list (recall) 116. Alternatively, in a case of being set so as to receive a completion notice from the recall processing unit 125 when the entire recall processing is completed, the determination in S21 may be performed by checking whether or not the completion notice from the recall processing unit 125 has been received.

In a case where it is determined that some LVs 52, for which recall is not yet implemented, exist in the sub-LV list (recall) 116 (S21: Yes), the processing makes a transition to S16. Note that after the processing stands by (waits for) a predetermined time period until recall is already implemented for at least one of the LVs 52, for which recall is not yet been implemented, the processing may make a transition to S16.

When it is determined that no LV 52, for which recall is not yet implemented, exists in the sub-LV list (recall) 116 (S21: No), it means that the entire export processing and the entire recall processing are completed. Therefore, the export processing unit 124 outputs a message of normal termination (S22) and causes, via the IDP 28, the robot 32 to unmount the PVs 62 from the drives 31 (S23), and the export processing is terminated. The message output in S22 may be a response to, for example, the host device 4.

Note that regarding a processing group of S16 and S17, a processing group of S18 to S20, and a processing group of S21 to S23, these processing groups may be performed in any order.

Figure 15:
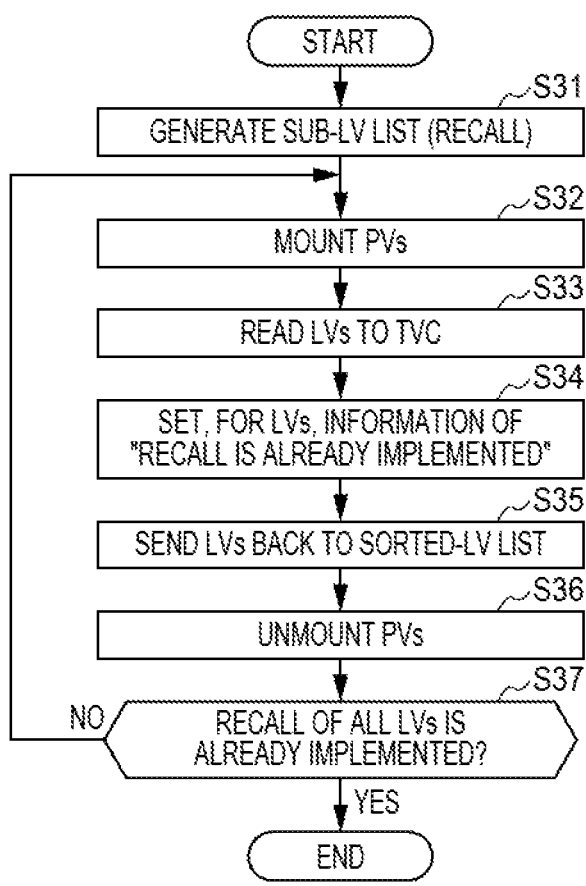
FIG. 15 is a flowchart illustrating an example of an operation of recall processing in a virtual tape system according to an embodiment.

Next, to describe the recall processing, as illustrated in FIG. 15, the processing execution unit 123 selects, from the sorted-LV list 114, the off-cache LVs 52 in a registration order and creates the sub-LV list (recall) 116 (S31). At this time, in each of the LVs 52 in the sub-LV list (recall) 116, as information indicating that recall is not yet implemented, the recall implementation flag is set to, for example, "1".

Next, the recall processing unit 125 causes, via the IDP 28, the robot 32 to mount, on the drives 31, the PVs 61 for saving in which the corresponding LVs 52 registered in the sub-LV list (recall) 116 are saved (S32).

The recall processing unit 125 causes the IDP 28 to read, to the TVC 21, the LVs 52 that serve as export targets and that are stored in the PVs 61 for saving (S33), and the recall processing unit 125 sets, for the LVs 52 on which recall is completed, information indicating that recall is already implemented (S34). As the information indicating that recall is already implemented, the recall implementation flag may be set to, for example, "0" or "NULL".

The recall processing unit 125 sends, back to the sorted-LV list 114, the LVs 52 for which recall is completed (S35), and the recall processing unit 125 causes, via the IDP 28, the robot 32 to unmount the PVs 61 for saving from the drives 31 (S36).

Next, the recall processing unit 125 determines whether or not recall of all the LVs 52 in the sub-LV list (recall) 116 is already implemented (S37). When any LVs 52, for which recall is not yet implemented, exist (S37: No), the processing makes a transition to S32.

In a case where recall of all the LVs 52 is already implemented (S37: Yes), the recall processing finishes.

The processing operations in S34 to S36 may be performed in any order.

Next, processing in a case where, in S4 in FIG. 13, the determination processing unit 122 determines that "Y" is less than or equal to "X" (in fact, "Y"="X") (S4: No) will be described with reference to FIG. 16.

Figure 16:
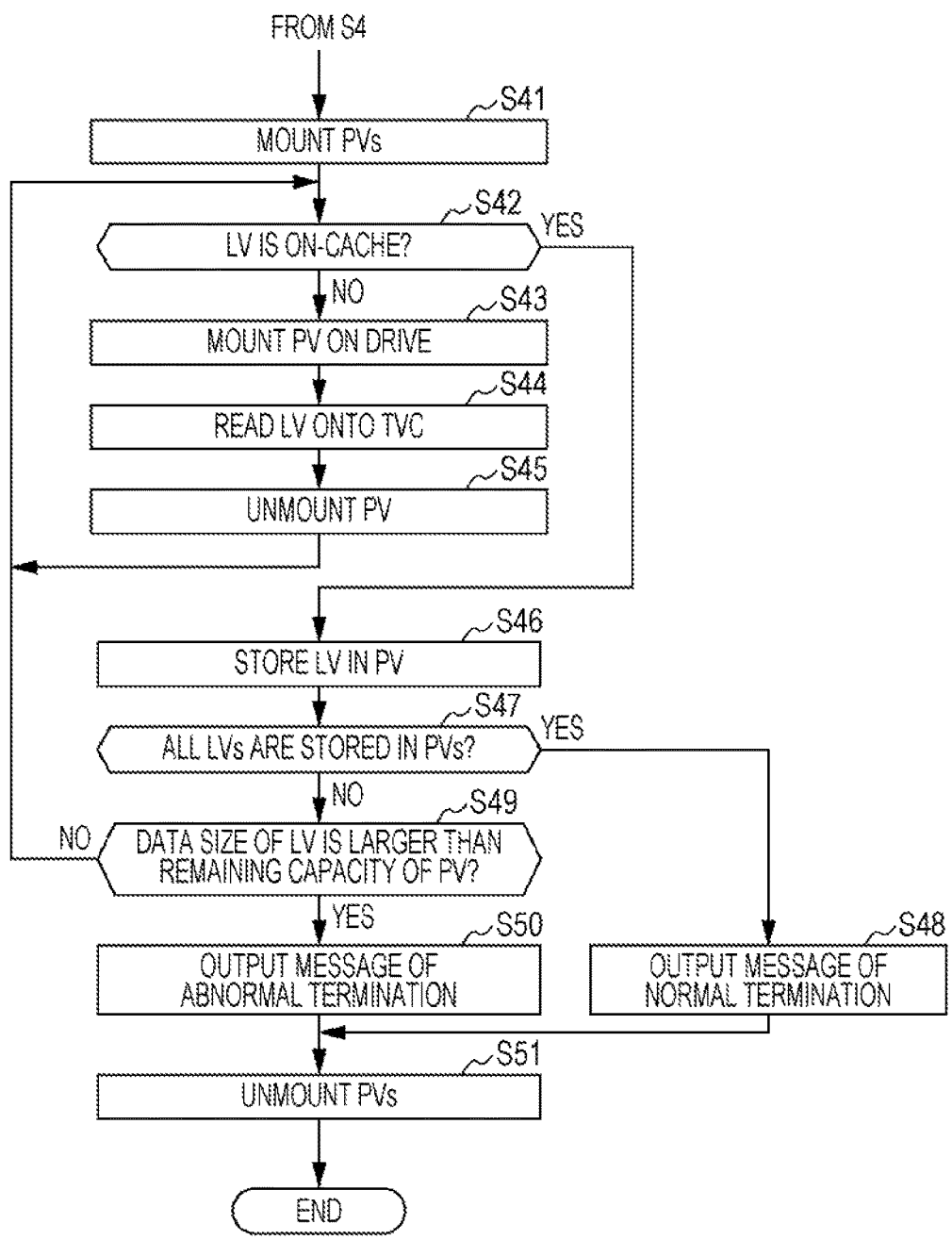
FIG. 16 is a flowchart illustrating examples of operations of export processing and recall processing based on an LV list in a virtual tape system according to an embodiment.

As illustrated in FIG. 16, in S41, the export processing unit 124 causes, via the IDP 28, the robot 32 to mount the PVs 62 for export on the drives 31.

When the mounting of the PVs 62 is completed, the export processing unit 124 references the LV information table 111, selects one of the LVs 50 specified in the LV list 112, for example, in order of setting in the LV list 112, and determines whether or not the relevant LV 50 is on-cache (S42). In a case where the relevant LV 50 is on-cache (S42: Yes), the processing makes a transition to S46.

In a case where the relevant LV 50 is off-cache (S42: No), the recall processing unit 125 causes, via the IDP 28, the robot 32 to mount, on one of the drives 31, the PV 61 in which the relevant off-cache LV 50 (LV 52) is saved (S43). The recall processing unit 125 instructs, via the IDP 28, the drive 31 to read the relevant LV 51 stored in the mounted PV 61, and the IDP 28 loads the relevant LV 51 stored in the corresponding PV 61, which is acquired through control of the drive 31, into the TVC 21 (S44). The recall processing unit 125 causes, via the IDP 28, the robot 32 to unmount the PV 61 from the drive 31 (S45), and the processing makes a transition to S42.

In S46, the export processing unit 124 causes, via the IDP 28, the drives 31 to store (write) the on-cache LVs 51 in the PVs 62 mounted in S41. Based on the LV list 112, the export processing unit 124 determines whether or not all the LVs 50 serving as export targets are stored in the PVs 62 for export (S47).

In a case where all the LVs 50 serving as export targets are stored in the PVs 62 (S47: Yes), the processing execution unit 123 outputs a message of normal termination (S48), and the processing makes a transition to S51.

In S51, the export processing unit 124 causes, via the IDP 28, the robot 32 to unmount the PVs 62 from the drives 31, and the export processing and the recall processing, based on an export request, finish.

In a case where some of the LVs 50, which serve as export targets and are not yet stored in the PVs 62, exist (S47: No), the processing execution unit 123 determines whether or not the data size of the subsequent LV 50 in, for example, the LV list 112 is larger than the remaining capacity of the PVs 62 (S49). In a case where the data size of the subsequent LV 50 is less than or equal to the remaining capacity of the PVs 62 (S49: No), the processing makes a transition to S42.

In a case where the data size of the subsequent LV 50 is larger than the remaining capacity of the corresponding PVs 62 (S49: Yes), the processing execution unit 123 outputs a message of abnormal termination (S50), and the processing makes a transition to S51. The message of abnormal termination means that LVs 50 serving as export targets do not fall within the PVs 62 for export prepared in advance. For example, based on the message of abnormal termination, the operator may register a new PV 62 in the TR-PVG table 113 and may instruct the VLP 29 to resume export based on the LV list 112, which has been performed partway.

As described above, in a case where the export targets include off-cache LVs 52, selection of the LVs 50 to be registered in the sub-LV list 115 or the PVs 62 to serve as registration destinations and implementation of the export processing and recall processing based on the sub-LV list 115 may be realized by any one of many methods. Hereinafter, such other examples will be described.

First Modification Example

Figure 17:
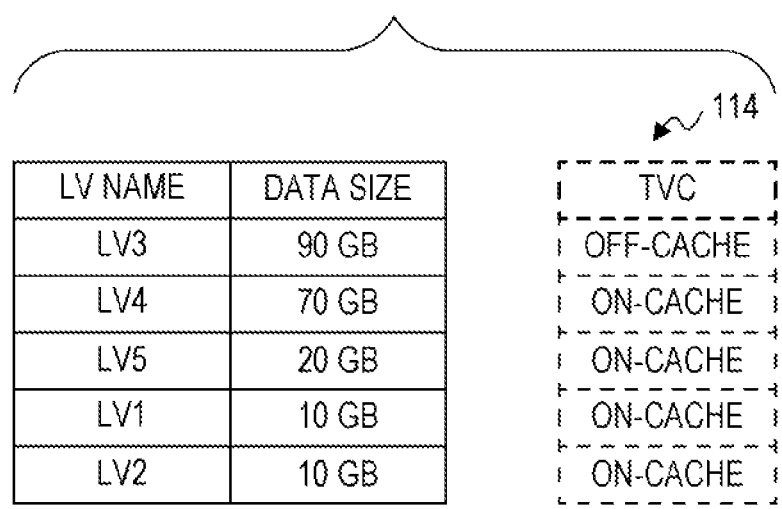
FIG. 17 is a diagram illustrating an example of data set in a sorted-LV list according to a first method of a first modification example.

In a first method of a first modification example, in the same way as the embodiment, processing may be performed while prioritizing the on-cache LVs 51. However, a method for selection of the PVs 62 serving as allocation destinations of the LVs 51 is different. Hereinafter, as exemplified in FIG. 17, a case where the LV3 (90 GB) is off-cache in the sorted-LV list 114 or 114' is assumed.

As illustrated in FIG. 18, the processing execution unit 123 may allocate the on-cache LV4, LV5, LV1, and LV2 to one of the PVs 62, for example, the PV1 serving as the PV 62 having a lower number to the extent of falling within the data storage size of the PV 62. In the example of FIG. 18, in the sub-LV list 115, the LV4 (70 GB), the LV5 (20 GB), and the LV1 (10 GB) are allocated to the PV1 in the setting order of the sorted-LV list 114, and since the PV1 is filled, the LV2 (10 GB) is allocated to the PV2.

As implementation methods for the export processing and the recall processing, the same methods as those described in the embodiment may be adopted.

In this way, by allocating the on-cache LVs 51 to one of the PVs 62 on a priority basis, the export processing of the PV1 (and the PV2) and the recall processing of the LV3 to be stored in the PV2 are implemented in parallel. Therefore, it is possible to achieve the same effect as that of the embodiment.

The allocation is performed so that the on-cache LVs 51 fall within one or more PVs 62, based on the data sizes thereof. The PVs 62 selected at this time are the PVs 62 having, for example, lower numbers. Therefore, the sub-LV list 115 of the relevant PVs 62 are likely to be subjected to implementation of the export processing at an early stage and are less likely to become targets of regeneration of the sub-LV list 115, which is to be caused in response to sending back of the LVs 52 for which recall is completed.

Accordingly, it is possible to fix the sub-LV list 115 of some of the PVs 62 while prioritizing the on-cache LVs 51. Therefore, it is possible to flexibly deal with a combination of the on-cache states and the off-cache states of the LVs 50 serving as export targets.

In a second method of the first modification example, based on the sub-LV list 115 and the sub-LV list (recall) 116 that are generated in the embodiment or the first method of the first modification example, it is possible to implement the export processing and the recall processing by using the following method.

For example, in S17 illustrated in FIG. 14, the export processing unit 124 may select, as the LVs 51 to be sent back to the sorted-LV list 114, the LVs 51 in the sub-LV list 115 for which export is already implemented, in addition to the sub-LV list 115 for which export is not yet implemented or is currently implemented. The implemented sub-LV list 115 selected as a sending back target may be limited to the sub-LV list 115 in which a remaining capacity is greater than or equal to a predetermined percentage, for example, is greater than or equal to 10% of a data storage size (alternatively, a used amount is less than or equal to a predetermined percentage, for example, is less than or equal to 90% of the data storage size).

Thus, it is possible to achieve the same effect as that of the embodiment, and furthermore, it is possible for the PV 62, whose remaining capacity is large and on which export is already implemented, to store therein the LV 52 for which recall is completed after export. Accordingly, it is possible to flexibly deal with a combination of the on-cache states and the off-cache states of the LVs 50 serving as export targets.

Depending on a combination of the on-cache states and the off-cache states of the LVs 50 serving as export targets, in one of the embodiment and the first and second methods of the first modification example, the number of the PVs 62 to be used is likely to exceed a number sufficient for storing the total data size of the LVs 50.

A third method of the first modification example proposes processing in a case where, at the time of optimizing export, the number of the PVs 62 to be used is predicted to exceed a number sufficient for storing the total data size of the LVs 50, for example, the value "X" calculated by the determination processing unit 122.

For example, the processing execution unit 123 may compare the remaining capacity of each of the generated or regenerated sub-LV lists 115 with the data sizes of the LVs 52 that are included in the sub-LV list (recall) 116 and for which recall is not yet implemented, thereby predicting the number of the PVs 62 to be used. For example, on the assumption that recall of the LVs 52 is completed in the setting order of the LVs 52 in the sub-LV list (recall) 116, simulation or the like of an algorithm for regenerating the sub-LV list 115 may be performed, thereby performing this prediction. In addition, the input-output (I/O) performances of the PVs 62, the drives 31, and the TVC 21 and the performance of mount and unmount operations of the robot 32 may be considered.

In accordance with the prediction result, the processing execution unit 123 may perform the following processing (i) or (ii).

(i) Continue optimization of export.

In a case where, as the prediction result, the number of the PVs 62 to be used is smaller than the value of the number "Y" of rolls of the PVs used in terms of the storing order while exceeding the value of "X", the processing execution unit 123 may continue the optimization of export.

(ii) Stop the optimization of export and implement export in the setting order of the LVs 50 in the LV list 112.

In a case where, as the prediction result, the number of the PVs 62 to be used exceeds the value of "X" and is equal to the value of "Y", the processing execution unit 123 may stop the optimization of export and may implement the processing operations in S41 to S51 in FIG. 16. Note that in a case where the above-mentioned prediction result is obtained at a stage of the regeneration of the sub-LV list 115, in other words, at a stage of currently implementing the export processing and the recall processing, the processing operations may be continued (see the above-mentioned (i)).

As described above, according to the processing execution unit 123, at timings before export is implemented or at which export is currently implemented, it is possible to predict the number of the PVs 62 to be used and to dynamically determine whether or not to allow the optimization of export to be implemented. Accordingly, even in a case where the number of the PVs 62 to be used exceeds "X" depending on, for example, a combination of the data sizes of the LVs 50 serving as export targets or a combination of the on-cache states and the off-cache states thereof, it is possible to select adequate processing from among the continuing and the stopping of the optimization of export.

As a second modification example of the selection method for the LVs 50 and the implementation method for the export processing and the recall processing in the above-mentioned embodiment, in place of the embodiment and the first to third methods of the first modification example described above, the following processing may be implemented.

For example, the processing execution unit 123 may generate a sub-LV list 115' illustrated in FIG. 19. As illustrated in FIG. 19, in the sub-LV list 115', in addition to the sub-LV list 115 illustrated in FIG. 9, information indicating whether or not being on-cache in the TVC 21 and an export implementation flag indicating whether not yet being implemented or being already implemented are further set, for example. In the example of FIG. 19, the export implementation flag is provided for each of the LVs 50.

Figure 20:
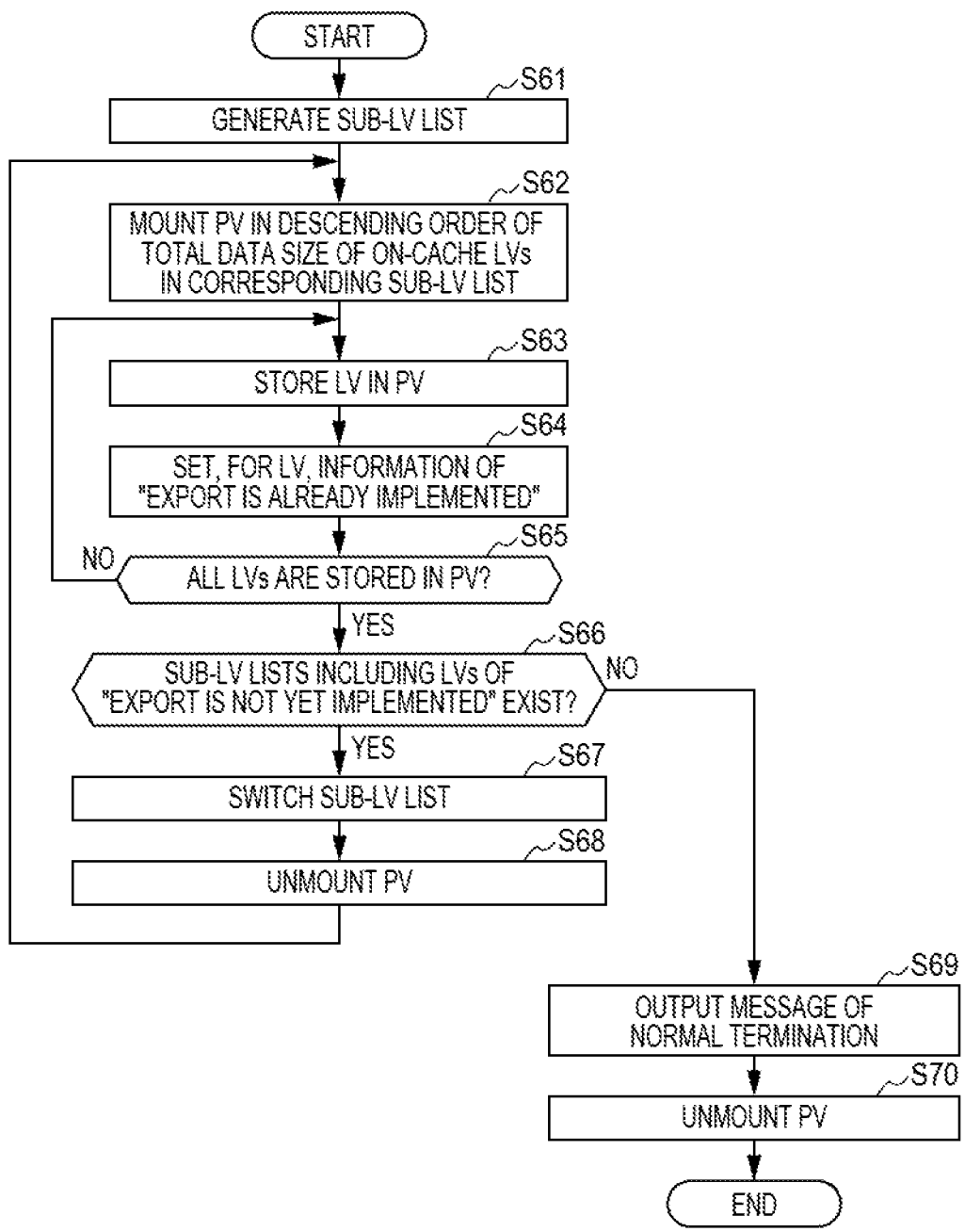
FIG. 20 is a flowchart illustrating an example of an operation of export processing in a virtual tape system according to a second modification example.
Figure 21:
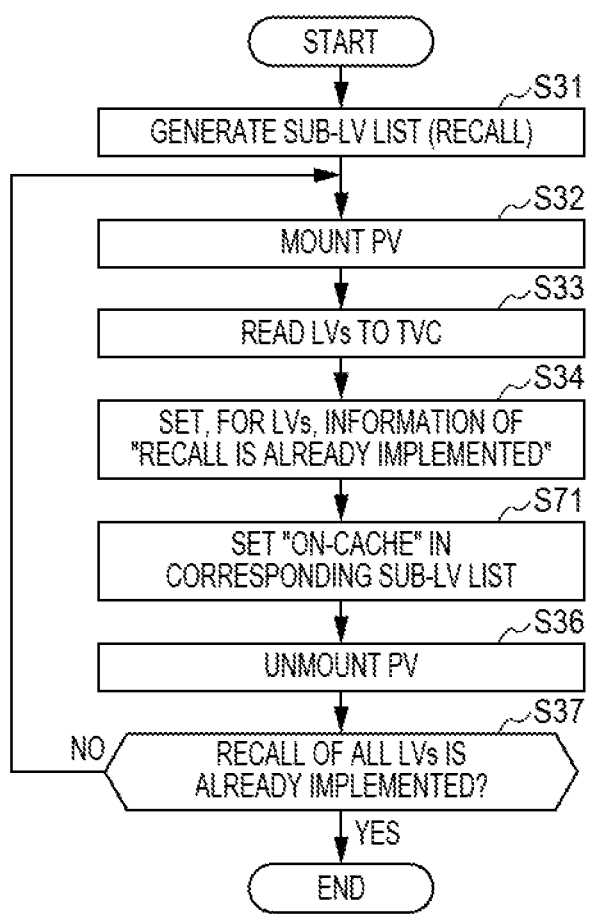
FIG. 21 is a flowchart illustrating an example of an operation of recall processing in a virtual tape system according to a second modification example.

FIG. 20 and FIG. 21 are flowcharts illustrating export processing and recall processing, respectively, according to the second modification example. In FIG. 20, regardless of the on-cache state and the off-cache state, the processing execution unit 123 assigns all the LVs 50 serving as export targets to the PVs 62 on the basis of data sizes, and generates the sub-LV list 115' (S61). At this time, the LVs 50 to be assigned are selected in a setting order in the sorted-LV list 114. The sub-LV list (recall) 116 may be generated in the same way as in the embodiment.

Based on the sub-LV list 115' illustrated in FIG. 19, the export processing unit 124 may perform export. As an example, while prioritizing the sub-LV list 115' in which the total data size of the on-cache LVs 50 is larger, the export processing unit 124 mounts the corresponding PV 62 in order (S62) and performs export of the corresponding on-cache LV 50 (S63).

The export processing unit 124 sets, in the sub-LV list 115', information of "export is already implemented" for the LV 51 of which export processing is completed (S64), and the export processing unit 124 determines whether or not all the on-cache LVs 51 in the sub-LV list 115' are stored in the PV 62 (S65). In a case where some of the on-cache LVs 51 are not yet stored in the PV 62 (S65: No), the processing makes a transition to S63.

In a case where all the on-cache LVs 51 are stored in the PV 62 (S65: Yes), the export processing unit 124 determines whether or not any sub-LV lists 115' including any LVs 51, of which export is not yet implemented, exist (S66).

In a case where some sub-LV lists 115' including some LVs 51, of which export is not yet implemented, exist (S66: Yes), the export processing unit 124 switches a processing target to one of the relevant sub-LV lists 115' (S67). The export processing unit 124 causes, via the IDP 28, the robot 32 to unmount the PV 62 from the drive 31 (S68), and the processing makes a transition to S62.

In a case where no sub-LV list 115' including any LVs 51, of which export is not yet implemented, exists (S66: No), the export processing unit 124 outputs a message of normal termination (S69). The export processing unit 124 causes, via the IDP 28, the robot 32 to unmount the PV 62 from the drive 31 (S70), and the export processing finishes.

While being basically the same as the recall processing illustrated in FIG. 15, the recall processing illustrated in FIG. 21 is different therefrom in that a processing operation in S71 is performed in place of S35 illustrated in FIG. 15. In S71, the recall processing unit 125 sets "on-cache" in the sub-LV list 115' for the LV 52 for which recall is completed.

As described above, according to the method of the second modification example, all the LVs 50 serving as export targets, which include the on-cache state and the off-cache state, are allocated to the PVs 62, based on the data sizes thereof, thereby generating the sub-LV lists 115'. Based on the sub-LV list 115', export is performed while prioritizing the on-cache LVs 51, and recall of the off-cache LVs 52 is performed in parallel therewith. Regarding the off-cache LVs 50, when recall is completed and the states thereof in the sub-LV list 115' are changed from "off-cache" to "on-cache", the execution order of export is adjusted, and export of the relevant LVs 50 is performed.

In other words, for the LVs 50 on which control performed by the recall processing unit 125 is completed, the export processing unit 124 according to the second modification example optimizes an order of writing the relevant LVs 50 in the sub-LV list 115. This optimization may include, for example, prioritizing the order of writing the LVs 50, which have been changed from the off-cache state to the on-cache state, over the order of writing the other LVs 50 in the off-cache state, thereby controlling the former LVs 50 so that the former LVs 50 become targets to be stored in the PVs 62 in S63.

Thus, it is possible to achieve the same effect as that of the embodiment. Furthermore, since the LVs 50 to be allocated to the sub-LV list 115 are fixed at a stage of generating the sub-LV list 115', it is possible to stably keep, to a minimum, the number of the PVs 62 to be used, regardless of the cache states of the LVs 50.

The method of the second modification example may be added, to one of the embodiment and the first to third method of the first modification example or a combination of two or more thereof, and implemented.

Next, example of a hardware configuration of the ICP 27, the IDP 28, and the VLP 29 included in the virtual tape device 2 illustrated in FIG. 1 will be described with reference to FIG. 22. Since the ICP 27, the IDP 28, and the VLP 29 may each have the same hardware configuration, an example of the hardware configuration of the VLP 29 will be described as a representative thereof.

Figure 22:
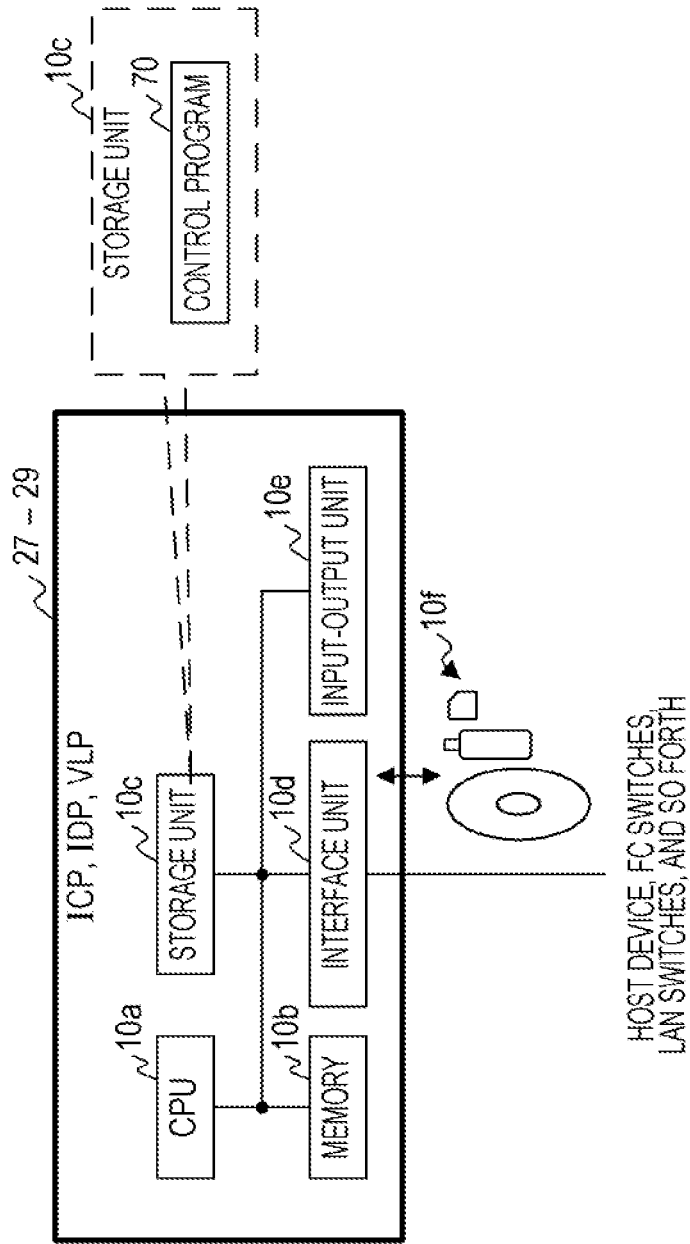
FIG. 22 is a diagram illustrating an example of hardware configuration of an ICP, an IDP, and a VLP included in a virtual tape device illustrated in FIG. 1.
Figure 23:
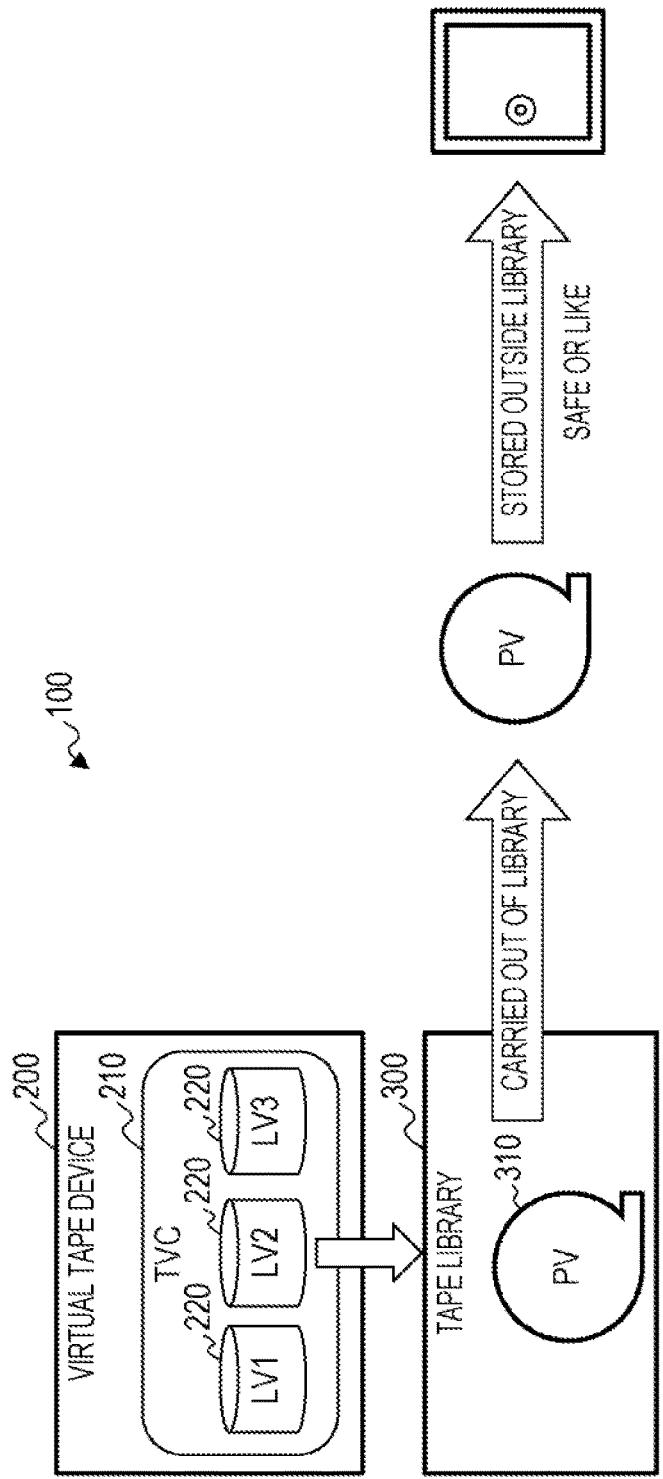
FIG. 23 is a diagram illustrating an example of a configuration of a virtual tape system.
Figure 24:
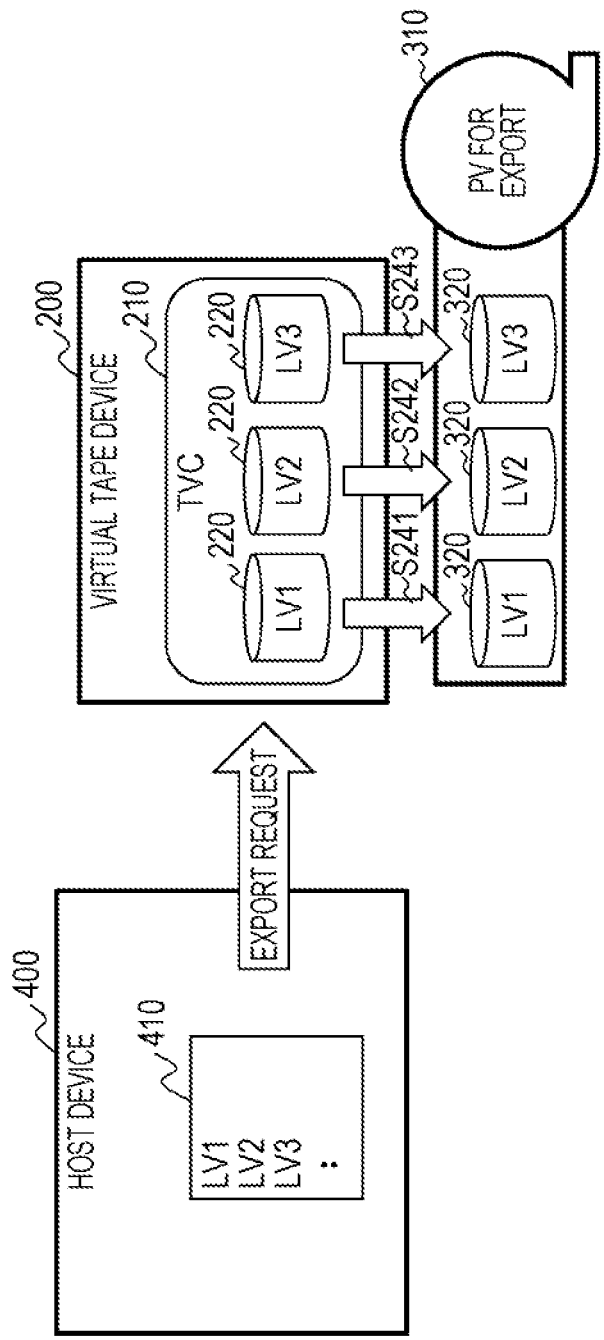
FIG. 24 is a diagram illustrating export processing in a virtual tape system.
Figure 25:
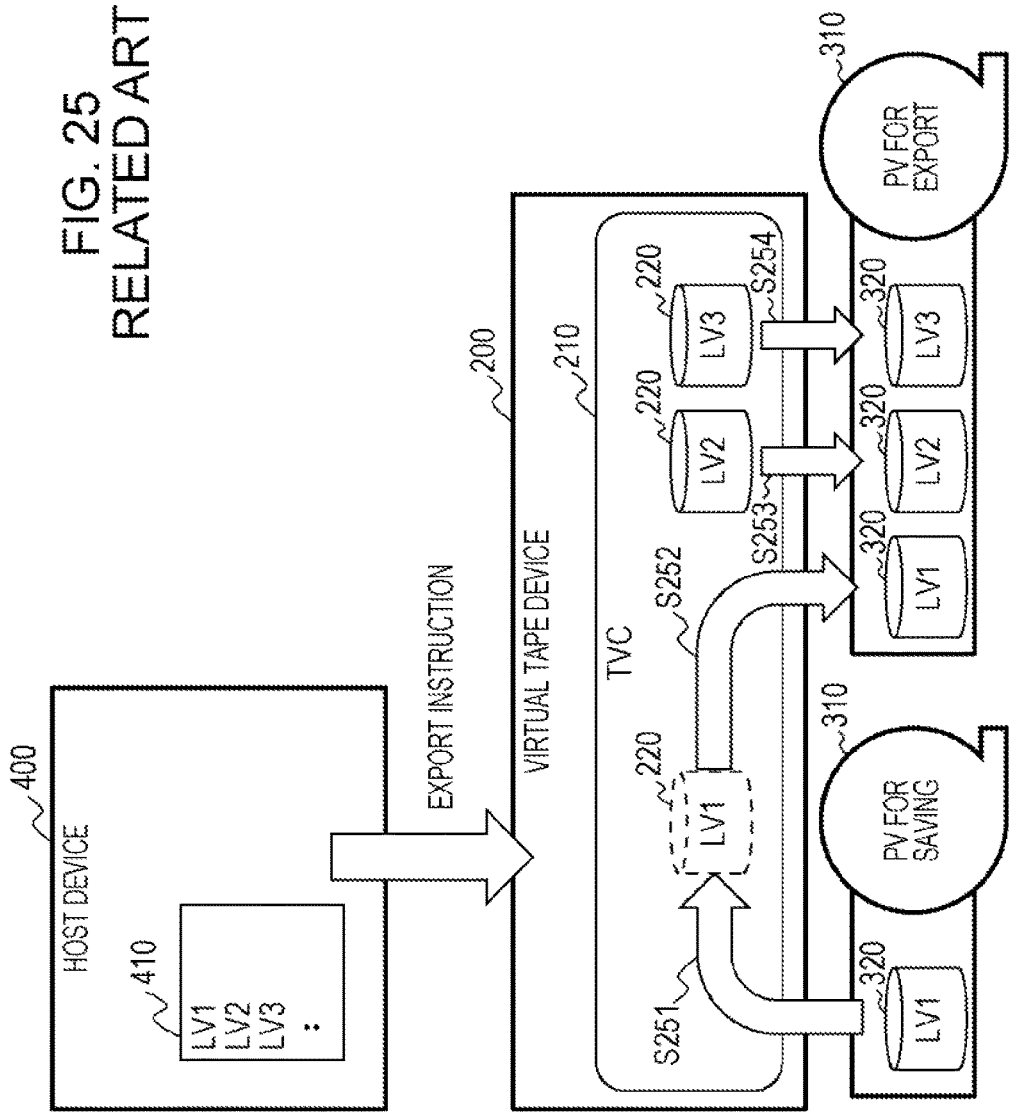
FIG. 25 is a diagram illustrating examples of export processing and recall processing in a virtual tape system.
Figure 26:
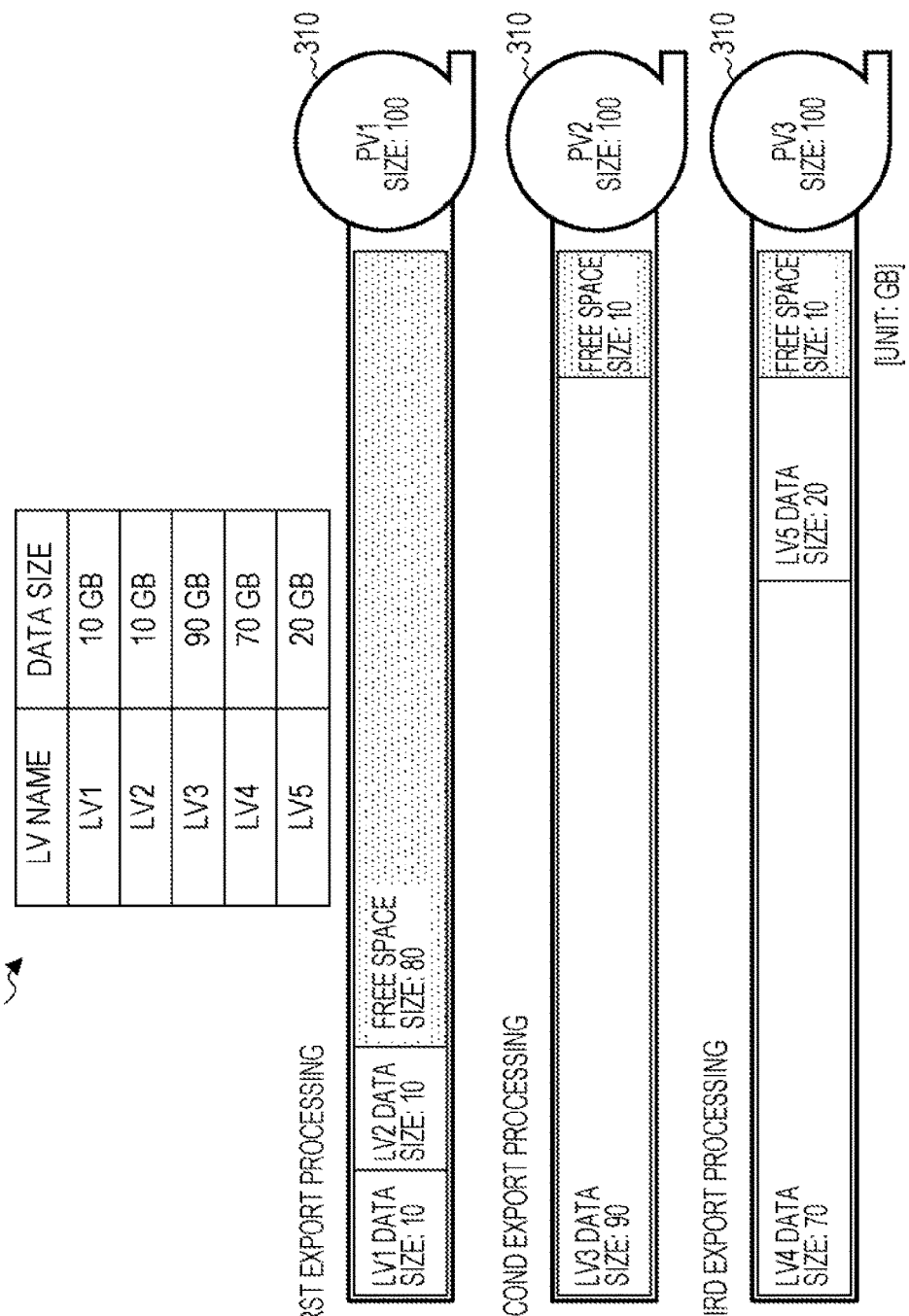
FIG. 26 is a diagram illustrating an example of a state in which LVs are stored in PVs for export.

As illustrated in FIG. 22, the VLPs 29 each include, for example, a CPU 10a, a memory 10b, a storage unit 10c, an interface unit 10d, and an input-output unit 10e.

The CPU 10a is an example of a processor that performs various control and arithmetic operations. The CPU 10a may be communicably coupled to individual blocks in the VLP 29 via a bus. As the processor, another arithmetic processing device, for example, an integrated circuit (IC) such as a micro processing unit (MPU) may be used in place of the CPU 10a.

The memory 10b is an example of hardware storing therein various data and programs. The memory unit 11 illustrated in FIG. 3 may be realized by a storage area of the memory 10b. As the memory 10b, a volatile memory such as, for example, a RAM may be cited.

The storage unit 10c is an example of hardware storing therein various data and programs. As the storage unit 10c, for example, various kinds of storage devices including a magnetic disk device such as an HDD, a semiconductor drive device such as an SSD, a nonvolatile memory such as a flash memory or a read-only memory (ROM) may be cited.

The storage unit 10c may store therein, for example, a control program 70 that realizes all or some of various kinds of functions of the VLP 29. In this case, the CPU 10a may realize the functions of the VLP 29 by loading the control program 70 stored in the storage unit 10c into the memory 10b and executing the control program 70.

The interface unit 10d is an example of a communication interface that performs coupling to the host device 4, the FC switch 22, the LAN switch 23, a management server (not illustrated), and so forth, and performs control of communication and so forth. As the interface unit 10d, for example, a network interface such as a LAN card and an interface compliant with, storage area network (SAN), FC, or Infini-Band may be cited.

The interface unit 10d may include a read unit that reads data and programs recorded in a recording medium 10f. The read unit may include a coupling terminal or a device to or into which the computer-readable recording medium 10f is coupled or inserted. As the read unit, for example, an adapter compliant with a universal serial bus (USB) or the like, a drive device to access a recording disk, a card reader to access a flash memory such as a secure digital (SD) card, and so forth may be cited. The control program 70 may be stored in the recording medium 10f.

The input-output unit 10e may include at least some of input units such as a mouse, a keyboard, and an operation button and an output unit such as a display. The input unit may be used for, for example, various operations such as registration and a modification of a setting and selection (switching) of a mode of a system and a work such as inputting of data, performed by an operator or the like, and the output unit may be used for check of a setting by the operator or the like and outputting of various notices and so forth.

The above-mentioned hardware configuration of the ICP 27, the IDP 28, and the VLP 29 is an exemplification. Accordingly, a decrease or an increase in hardware (for example, addition or omission of an arbitrary block), division of hardware, integration of hardware in an arbitrary combination, and addition or omission of a bus may be arbitrarily performed between the ICPs 27, the IDPs 28, and the VLPs 29 or in each of the ICPs 27, the IDPs 28, and the VLPs 29.

The technology according to the embodiment and the first and second modification examples described above, may be altered, modified, and implemented as follows.

For example, the individual functional blocks of the VLP 29 illustrated in FIG. 3 may be merged in an arbitrary combination and may be divided.

The number of the LVs 50 and the PVs 62, the data sizes of the LVs 50, and the data storage sizes of the PVs 62 are just exemplifications and are not limited to those described above. As the values thereof, arbitrary numerical values may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control device, comprising:
a processor configured to
receive an execution request for write processing of writing data of logical volumes to second physical volumes, the data of the logical volumes being stored in first physical volumes,
acquire data sizes of the respective logical volumes,
generate write information based on the acquired data sizes and free spaces of storage areas of the respective second physical volumes, the write information including order information and allocation information, the order information indicating an order of writing the data of the logical volumes to the second physical volumes, the allocation information indicating to which second physical volume the data of the respective logical volumes is to be written,
perform, on basis of the write information, control of writing first data of the logical volumes from a cache unit to the second physical volumes, the first data already being cached in the cache unit,
perform control of reading second data of the logical volumes from the first physical volumes to the cache unit, the second data not yet being cached in the cache unit,
reallocate the allocation information based on data sizes of first logical volumes among the logical volumes for which the control of reading is completed, and for which control of export is not completed;
optimize the write information in response to completion of the control of reading; and
reallocate the allocation information for second logical volumes among the first logical volumes, for which the control of writing for the second logical volumes is not completed.

2. The control device according to claim 1, wherein the processor is configured to
generate the write information for logical volumes storing therein the first data,
generate read information for logical volumes storing therein the second data, and
perform the control of reading on basis of the read information.

3. The control device according to claim 1, wherein the processor is configured to
optimize, for logical volumes for which the control of reading is completed, the order indicated by the order information.

4. The control device according to claim 1, wherein the processor is configured to
determine, in descending order of the data sizes, to which second physical volume the data of the respective logical volumes is to be written.

5. The control device according to claim 1, wherein the processor is configured to
determine, on basis of the data sizes and the free spaces, whether to generate the write information, and
generate the write information upon determining to generate the write information.

6. The control device according to claim 5, wherein the processor is configured to
calculate a first value indicating a number of the second physical volumes used in a case of executing the write processing in order of the logical volumes specified in the execution request,
calculate a second value obtained by dividing a total of the free spaces by a total of the data sizes, and
determine to generate the write information when the first value is greater than the second value.

7. The control device according to claim 1, wherein the processor is configured to
perform the control of writing and the control of reading in parallel.

8. A non-transitory computer-readable recording medium having stored therein a program that causes a computer to execute a process, the process comprising:
receiving an execution request for write processing of writing data of logical volumes to second physical volumes, the data of the logical volumes being stored in first physical volumes;
acquiring data sizes of the respective logical volumes;
generating write information based on the acquired data sizes and free spaces of storage areas of the respective second physical volumes, the write information including order information and allocation information, the order information indicating an order of writing the data of the logical volumes to the second physical volumes, the allocation information indicating to which second physical volume the data of the respective logical volumes is to be written;
performing, on basis of the write information, control of writing first data of the logical volumes from a cache unit to the second physical volumes, the first data already being cached in the cache unit;
performing control of reading second data of the logical volumes from the first physical volumes to the cache unit, the second data not yet being cached in the cache unit;
reallocating the allocation information based on data sizes of first logical volumes among the logical volumes for which the control of reading is completed, and for which control of export is not completed;
optimizing the write information in response to completion of the control of reading; and reallocating the allocation information for second logical volumes among the first logical volumes, for which the control of writing for the second logical volumes is not completed.

9. The non-transitory computer-readable recording medium according to claim 8, the process comprising:
generating the write information for logical volumes storing therein the first data;
generating read information for logical volumes storing therein the second data; and
performing the control of reading on basis of the read information.

10. The non-transitory computer-readable recording medium according to claim 8, the process comprising:
optimizing, for logical volumes for which the control of reading is completed, the order indicated by the order information.

11. The non-transitory computer-readable recording medium according to claim 8, the process comprising:
determining, in descending order of the data sizes, to which second physical volume the data of the respective logical volumes is to be written.

12. The non-transitory computer-readable recording medium according to claim 8, the process comprising:
determining, on basis of the data sizes and the free spaces, whether to generate the write information; and
generating the write information upon determining to generate the write information.

13. The non-transitory computer-readable recording medium according to claim 12, the process comprising:
calculating a first value indicating a number of the second physical volumes used in a case of executing the write processing in order of the logical volumes specified in the execution request;
calculating a second value obtained by dividing a total of the free spaces by a total of the data sizes; and
determining to generate the write information when the first value is greater than the second value.

14. The non-transitory computer-readable recording medium according to claim 8, the process comprising:
performing the control of writing and the control of reading in parallel.

15. A control method, comprising:
receiving, by a computer, an execution request for write processing of writing data of logical volumes to second physical volumes, the data of the logical volumes being stored in first physical volumes;
acquiring data sizes of the respective logical volumes;
generating write information based on the acquired data sizes and free spaces of storage areas of the respective second physical volumes, the write information including order information and allocation information, the order information indicating an order of writing the data of the logical volumes to the second physical volumes, the allocation information indicating to which second physical volume the data of the respective logical volumes is to be written;
performing, on basis of the write information, control of writing first data of the logical volumes from a cache unit to the second physical volumes, the first data already being cached in the cache unit;
performing control of reading second data of the logical volumes from the first physical volumes to the cache unit, the second data not yet being cached in the cache unit; and
reallocating the allocation information based on data sizes of first logical volumes among the logical volumes for which the control of reading is completed, and for which control of export is not completed;
optimizing the write information in response to completion of the control of reading; and
reallocating the allocation information for second logical volumes among the first logical volumes, for which the control of writing for the second logical volumes is not completed.

* * * * *